United States Patent
Muchow et al.

(10) Patent No.: US 8,299,645 B2
(45) Date of Patent: Oct. 30, 2012

(54) RENEWABLE ENERGY TRAILER

(75) Inventors: David J. Muchow, Arlington, VA (US);
Hugh Jones, Canastota, NY (US);
Albert Nunez, Takoma Park, MD (US);
Sara V. Zulkosky, Arlington, VA (US)

(73) Assignee: Skybuilt Power, Arlington, VA (US)

( * ) Notice: Subject to any disclaimer, the term of this patent is extended or adjusted under 35 U.S.C. 154(b) by 837 days.

(21) Appl. No.: 12/219,689

(22) Filed: Jul. 25, 2008

(65) Prior Publication Data

US 2009/0079161 A1    Mar. 26, 2009

Related U.S. Application Data

(60) Provisional application No. 60/935,130, filed on Jul. 27, 2007.

(51) Int. Cl.
*F03D 9/00* (2006.01)
(52) U.S. Cl. ............................................. 290/55; 307/65
(58) Field of Classification Search .................... 290/55; 307/65
See application file for complete search history.

(56) References Cited

U.S. PATENT DOCUMENTS

| | | |
|---|---|---|
| 4,117,342 A | 9/1978 | Melley, Jr. |
| 4,159,427 A * | 6/1979 | Wiedemann .................... 290/55 |
| 4,261,329 A | 4/1981 | Walsh et al. |
| 4,421,943 A | 12/1983 | Withjack |
| 4,553,037 A | 11/1985 | Veazey |
| 4,633,767 A | 1/1987 | Sain |
| 5,111,127 A | 5/1992 | Johnson |
| 5,184,502 A | 2/1993 | Adams et al. |
| 5,317,857 A | 6/1994 | Allison |
| 5,338,369 A | 8/1994 | Rawlings |
| 5,350,138 A | 9/1994 | Culbertson et al. |
| 5,379,596 A | 1/1995 | Grayson |
| 5,969,501 A | 10/1999 | Glidden et al. |
| 6,380,481 B1 | 4/2002 | Müller |
| 6,388,869 B1 | 5/2002 | Fauteux et al. |
| 6,394,359 B1 | 5/2002 | Morgan |
| 6,396,239 B1 | 5/2002 | Benn et al. |
| 6,426,606 B1 | 7/2002 | Purkey |
| 6,740,988 B2 * | 5/2004 | Tseng ............................. 290/44 |
| 6,783,032 B2 | 8/2004 | Fons |
| 6,791,206 B1 | 9/2004 | Woodbridge |
| 6,914,349 B2 | 7/2005 | Rajagopalan |
| 7,105,940 B2 * | 9/2006 | Weesner et al. ................. 290/44 |

(Continued)

FOREIGN PATENT DOCUMENTS

DE    375 498    5/1923

(Continued)

OTHER PUBLICATIONS

"STS-75", http://science.ksc.nasa.gov/shuttle/missions/sts-75/mission-sts--75.html, Jun. 29, 2001.

(Continued)

*Primary Examiner* — Kevin Hurley
(74) *Attorney, Agent, or Firm* — Finnegan, Henderson, Farabow, Garrett & Dunner, LLP

(57) ABSTRACT

A trailer includes a frame defining a body of the trailer. The trailer also includes a power system stored in the body of the trailer. At least a portion of the power system is integral to the body of the trailer. The power system includes at least one power generating device stored in the body and removable from the body.

51 Claims, 26 Drawing Sheets

U.S. PATENT DOCUMENTS

| | | | |
|---|---|---|---|
| 7,230,819 B2 | 6/2007 | Muchow et al. | |
| 7,469,541 B1 | 12/2008 | Melton et al. | |
| 7,471,000 B1 * | 12/2008 | Ruiz | 290/1 A |
| 7,531,270 B2 * | 5/2009 | Buck et al. | 429/120 |
| 7,652,389 B2 * | 1/2010 | Farmer | 290/55 |
| 7,821,147 B2 * | 10/2010 | Du Bois | 290/44 |
| 2002/0114983 A1 | 8/2002 | Frank et al. | |
| 2002/0121781 A1 * | 9/2002 | Douglas | 290/55 |
| 2002/0131864 A1 * | 9/2002 | Vos et al. | 416/25 |
| 2003/0230934 A1 | 12/2003 | Cordelli et al. | |
| 2005/0218657 A1 * | 10/2005 | Weesner et al. | 290/55 |
| 2006/0137348 A1 * | 6/2006 | Pas | 60/641.1 |
| 2006/0267348 A1 * | 11/2006 | Weitkamp et al. | 290/55 |
| 2008/0068782 A1 | 3/2008 | Muchow et al. | |
| 2008/0196758 A1 * | 8/2008 | McGuire | 136/245 |
| 2008/0231052 A1 * | 9/2008 | Farmer | 290/52 |
| 2010/0207452 A1 * | 8/2010 | Saab | 307/65 |
| 2010/0230968 A1 * | 9/2010 | Chernyshov | 290/44 |

FOREIGN PATENT DOCUMENTS

| | | |
|---|---|---|
| DE | 34 05 466 | 8/1985 |
| DE | 196 46 612 | 3/1998 |
| DE | 93 21 520 | 7/1999 |
| DE | 100 00 874 | 7/2001 |
| EP | 0 237 445 | 9/1987 |
| EP | 0 240 962 | 10/1987 |
| ES | 2119687 | 10/1998 |
| FR | 2 614 368 | 10/1988 |
| GB | 2 158 219 | 11/1985 |
| GB | 2 329 534 | 3/1999 |
| JP | 09195534 | 7/1997 |
| WO | WO 94/20802 | 9/1994 |
| WO | WO 01/92721 A1 | 12/2001 |
| WO | WO 03/008803 | 1/2003 |
| WO | WO 2005/100786 A1 | 10/2005 |
| WO | WO 2007/039732 A2 | 4/2007 |

OTHER PUBLICATIONS

Linda Hales, "FutureShack: A Home for the Displaced," The Washington Post, May 15, 2004, at C2.

Floatograph Technologies, "Trailered Telescoping Mast with Self Contained Power," XP-002317274, retrieved from the Internet: http://www.floatograph.com/powertrailer, retrieved on Feb. 10, 2005 (9 pages).

International Search Report and Written Opinion of the International Searching Authority for International Application No. PCT/US2008/009072 mailed Jun. 22, 2009 (15 pages).

* cited by examiner

RENEWABLE ENERGY TRAILER

PRIORITY

This application claims the benefit of priority from U.S. Provisional Application No. 60/935,130, filed Jul. 27, 2007, which is herein incorporated by reference in its entirety.

STATEMENT REGARDING FEDERALLY SPONSORED RESEARCH

This invention was made with U.S. Government support under Contract No. W9124Q-06-P-0537, awarded by the Department of Defense. The U.S. Government has certain rights in this invention.

TECHNICAL FIELD

The present disclosure relates generally to a portable power system, and more particularly, to a trailer having a power system.

BACKGROUND

While electric power from traditional electrical grids is readily available in many locations throughout the world, there remain vast regions where no electric power is available. Even in locations where electric power is available, there are a variety of situations where a supplemental or substitute power source would be desirable.

Solar and wind power generating devices are known and may be applied in many different applications. Traditional solar and wind power generating devices and systems, however, have several shortcomings. For example, these devices have not been standardized. As a result, they must be custom built for each particular application, which makes these devices expensive. Second, they are not easily transported, such as on a trailer. Custom built solar and wind power devices typically require days to assemble or to disassemble. Further, traditional solar and wind power devices are not modular. Specifically, once a particular renewable energy generator has been designed and manufactured to include a certain number of photovoltaic devices or wind turbines, additional photovoltaic devices or wind turbines may not be easily added to the generator without significant difficulty including, for example redesign and modification of the solar power generator.

There currently exists a need for a standardized, modular, rapidly deployable, transportable power source using renewable and fuel-based power sources to address these issues.

SUMMARY

In one aspect, the present disclosure is directed to a trailer including a frame defining a body of the trailer. The trailer also includes a power system stored in the body of the trailer. At least a portion of the power system is integral to the body of the trailer. The power system includes at least one power generating device stored in the body and removable from the body.

In another aspect, the present disclosure is directed to a vehicle including a frame defining a body of the vehicle. The vehicle also includes a skid that is storable in the body of the vehicle and removable from the vehicle. The vehicle also includes a power system stored in the skid. At least a portion of the power system is integral to the skid. The power system includes at least one power generating device stored in the skid.

In yet another aspect, the present disclosure is directed to a transportable power system includes a trailer for storing at least one power generating device and at least one battery. The at least one power generating device is removable from the trailer. The at least one battery is capable of receiving power from the at least one power generating device.

In a further aspect, the present disclosure is directed to a trailer configured to be towed by a vehicle. The trailer includes a frame defining a body of the trailer and a power system stored in the body of the trailer. The body is integral to at least a portion of the power system. The power system includes at least one solar power generating device stored in the body and removable from the body. The power system also includes at least one wind power generating device stored in the body.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to exemplary embodiments of the invention, examples of which are illustrated in the accompanying drawings. Wherever possible, the same reference numbers will be used throughout the drawings to refer to the same or like parts.

Figure 1:
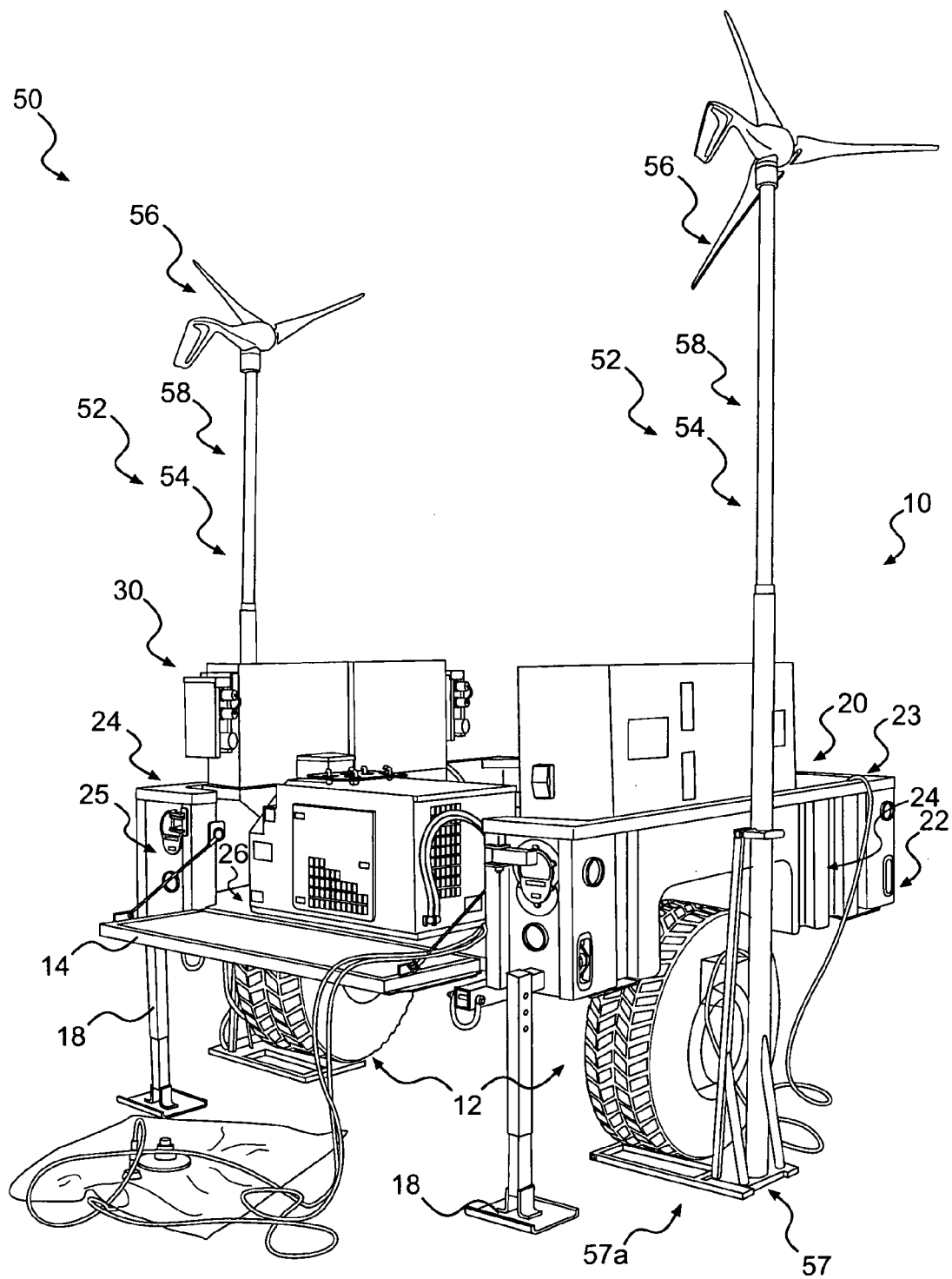
FIG. 1 is a perspective view of an exemplary disclosed trailer with a power system including a solar array, a battery system, a fuel power generating device, and deployed wind turbines.

FIG. 1 shows an interior of a trailer 10, wagon, or other vehicle designed to be hauled by a vehicle, such as a Humvee, truck, tractor, car, or other machine. For example, as shown, the trailer 10 may be a standard 10-foot Army trailer, such as a Light Tactical Trailer—Heavy Chassis (LTT-HC) (National Stock No. 2330-01-387-5424). The trailer 10 contains a power system 30 that resides in and that may be at least partially integrated with the trailer 10. The trailer 10 may include wheels 12 to allow the vehicle to tow the trailer 10, a rear door 14 to allow access into the trailer 10, and a trailer hitch 16 (FIGS. 3-14) to couple the trailer 10 to the vehicle for towing of the trailer 10. After the trailer 10 is delivered to a desired operating location, the trailer 10 may be operated so that the power system 30 may transmit power to one or more pieces of equipment, such as communications equipment, laptops, cell phones, etc. The power system 30 includes at least one power generating device, such as a solar array, a wind turbine, etc., which may be deployed to generate power, as described below.

The trailer 10 includes a body 20 defined by a supporting frame 22. The frame 22 is mounted upon the wheels 12 and includes a front panel 23, side panels 24, a rear panel 25 including the rear door 14, which may be lowered or raised depending on the use of the trailer 10, and a floor 26. Accordingly, as shown, the body 20 of the trailer 10 has an open top. Alternatively, the body 20 of the trailer may include a canvas or other type of top to define a complete enclosure or housing, and the rear door 14 may include a closing or locking mechanism that may include safety/security components.

The trailer 10 may be approximately 0.75 to 1.5 tons and may be equipped with drum brakes or air brakes. The trailer 10 may also include one or more trailer jacks 18 to support and level the trailer 10 when it is not hitched. The trailer jacks 18 may be mounted to the underside of the floor 26 of the trailer 10, to the hitch 16, or to the frame 22, e.g., the front panel 23, the side panels 24, or the rear panel 25.

The trailer 10 may be easy to attach to a rear of the towing vehicle and may allow for rapid deployment of the power generating devices provided inside the trailer 10 (e.g., in less than one hour, 3.5 hours, etc., depending on the complexity of the power system 30). Furthermore, the trailer 10 may provide a sturdy, protective housing for the power system 30. The trailer 10 and the components of the power system 30 included inside the trailer 10 may be rugged such that the trailer 10 and the power system 30 may withstand harsh environments. For example, the trailer 10 may be made with bulletproof or bullet resistant material. Even further, the trailer 10 may include photovoltaic (PV) material on all or part of the outer surface of the trailer 10.

Figure 4:
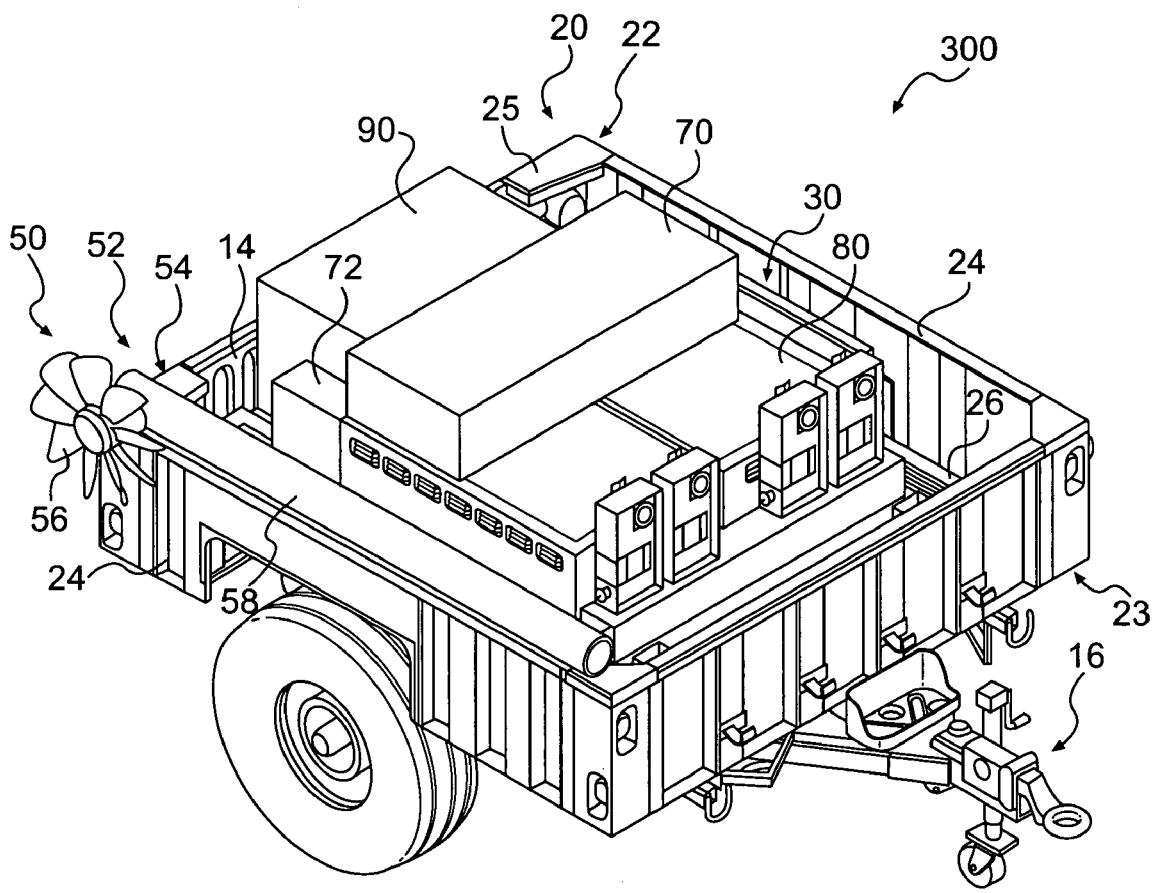
FIG. 4 is a perspective view of an exemplary disclosed trailer having a power system provided therein with a fully retracted wind turbine.
Figure 5:
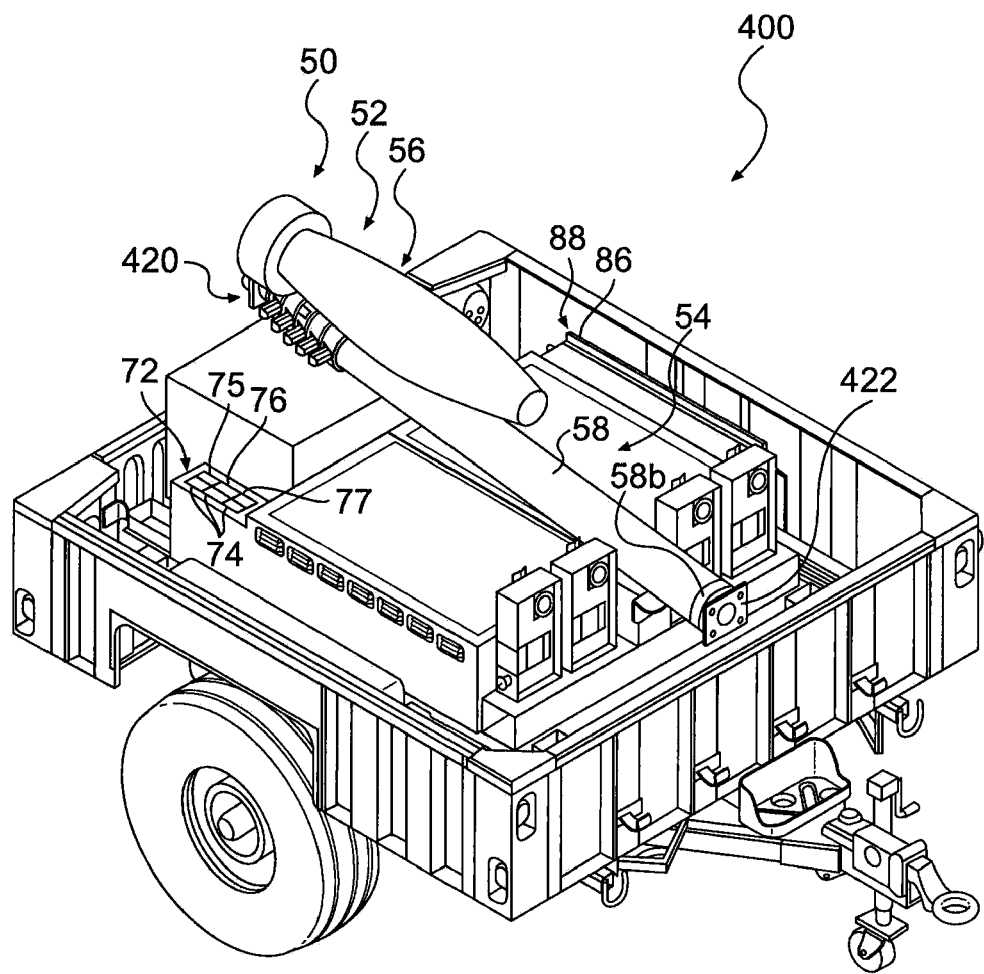
FIG. 5 is a perspective view of another exemplary disclosed trailer having a power system provided therein with a fully retracted wind turbine folded for transport.

The trailer body 20 may be capable of housing all of the components of the power system 30. As shown in FIGS. 1, 4, and 5, the components stored in the trailer body 20 may include components of the power system 30 such as a fold-out solar rigid or flexible panel (or photovoltaic) array 40 or other solar power generating device, a rapidly-deployable wind turbine system 50 or other wind power generating device, an inverter 70, a battery system 80 for back-up power, one or more fuel power generating devices 90, a fuel tank, remote control features, lighting, etc. The power system 30 may be operated continuously to satisfy a steady-state 24-hour continuous power requirement. For example, the power system 30 may provide a continuous power output of, e.g., 500 to 13,000 watts (e.g., 6,300 watts from the solar array 40, 800 watts from the wind turbine system 50, and 5,500 watts from a diesel fuel driven generator 90). Actual output of the power system 20 may vary depending on solar irradiation on site, wind, weather, etc. Alternatively, the power system 30 may take power from the towing vehicle or provide power to the towing vehicle.

Figure 2:
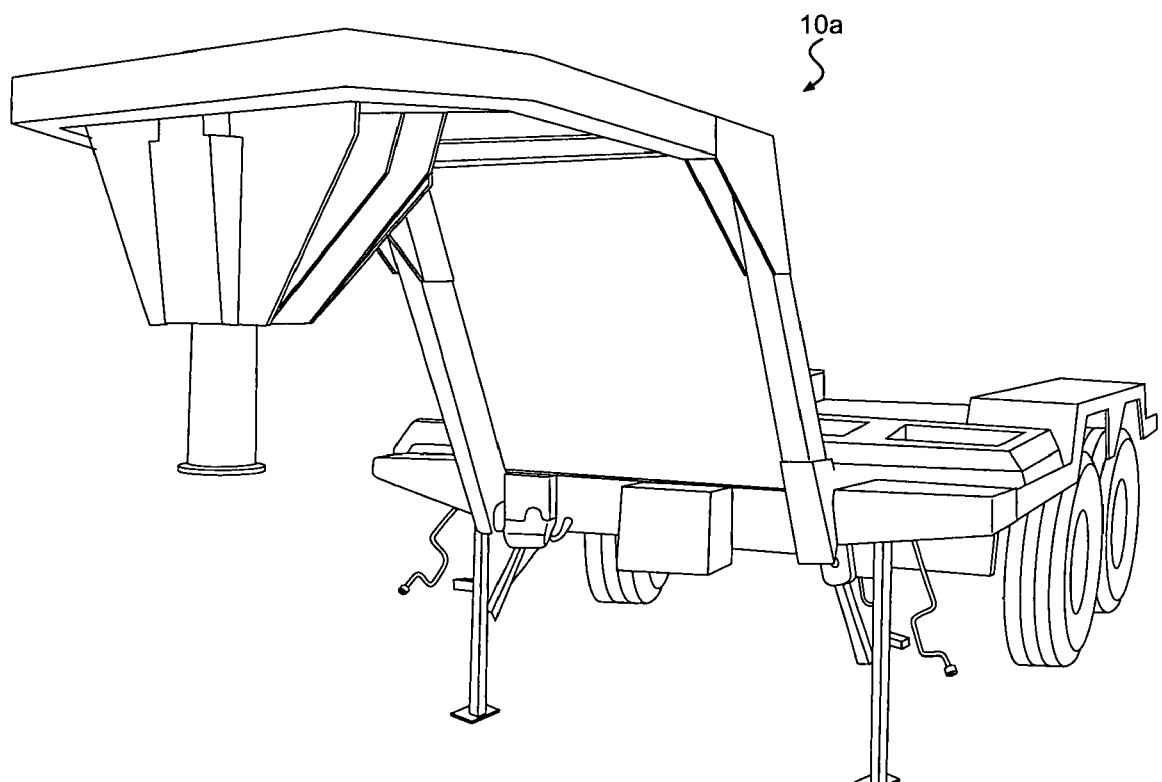
FIG. 2 is a perspective view of another exemplary disclosed trailer.

FIG. 2 shows a larger trailer 10a that may incorporate the power system 30. The trailer 10a may be an Oshkosh™ Packhorse Trailer, which is a five-ton trailer and which may include one or two axles. When incorporated into the trailer 10a, the power system 30 may provide a continuous power output of, e.g., 500 to 30,000 watts.

The components of the power system 30 may be separated and safeguarded from each other when stowed inside the trailer 10. As shown in FIGS. 1 and 4, the inverter 70, the battery system 80, and the fuel power generating device 90 may be permanently integrated into the trailer 10. The solar array 40 and the wind turbine system 50 may be removable from the interior of the trailer 10 and may be put back into the interior of the trailer 10 so that the trailer 10 and the power system 30 may be transported again to another location. Optionally, the wind turbine system 50 may be at least partially permanently integrated into the trailer 10, as shown in FIGS. 4-14.

The inverter 70 may be provided to convert various forms of direct current to various forms of alternating current. The power system 30 may also include receptacles (not shown) for storing power cords (not shown) that allow the power system 30 to plug and play with the equipment and other devices to be powered by the power system 30. The power system 30 may also provide a power interface by way of an external control panel 72 allowing for connection of a variety of load devices requiring different electrical configurations, e.g., load devices for either input or output with direct current, 120 volt alternating current (VAC), and/or 240 VAC. The control panel 72 may include a telecommunications interface, and/or one or more input and/or output connectors 74 (FIG. 5), such as one or more input connectors for the solar array 40, one or more input connectors for the wind turbine system 50, one or more AC load output connectors for supplying 120 VAC, one or more AC load output connectors for supplying 240 VAC, and/or one or more AC inputs for receiving 240 VAC from the fuel power generating device 90 or other source. In addition, the control panel 72 may include one or more coaxial cable connections for receiving or sending, e.g., cable television signals, one or more Ethernet connections for receiving or sending Ethernet signals, one or more antennae input or output connections, one or more circuit breaker panels having appropriate circuit breakers for the power system 30, and one or more grid tie interfaces. The input and output connectors may be configured for numerous different types of power connectors to provide increased versatility. The control panel 72 may also include one or more power meters or indicator lights. The control panel 72 or other component of the power system 30 may also include at least one emergency cut-off switch 75 (FIG. 5) for use by operators in the field during operation of the power system 30. Furthermore, additional power systems, power supplies, and/or loads may be easily plugged into the power system 30 to expand or reduce output and/or loads, or to connect additional power generating devices.

The power system 30 may also include data logging equipment (not shown) including, e.g., a global positioning (GPS) antenna/satellite system (not shown), and a transmitting device (not shown), such as a transceiver or antenna, to allow the power system 30 to be remotely monitored and/or controlled. For example, the data logging equipment may communicate information to one or more remote facilities or other monitoring facilities and devices. The power system 30 may include chemical and biological warfare (CBW) and other types of sensing systems, and/or antenna and GPS antennas. Even further, the trailer 10 may be configured to dispense marker dyes or other tracking mechanisms. These components of the power system 30 may be combined to create a highly reliable, hybrid power system for use outdoors in the field. Further, the antennas, transmitting devices, and/or other accessories may be disguised as a flora, fauna, etc., to avoid detection. The power system 30 may also automatically configure or allow the user to configure the input and/or output configuration of the power system 30 so that particular loads and/or internal needs (e.g., the battery system 80) are prioritized.

The power system 30 may also include a multi-level dashboard (not shown) or other control panel for controlling the power system 30. The dashboard or control system may be separate from the control panel 72 or included within the control panel 72. The dashboard may be capable of displaying information and/or providing controls of various levels of complexity. Thus, an untrained operator may operate and/or disable the power system 30 easily.

At least one automatic load shedding device 76 (FIG. 5) may be provided for automatically shedding non-critical loads to maintain critical loads, e.g., using one or more levels, bus bars, and circuits. The load shedding device 76 may determine which loads are non-critical loads for shedding and which loads are critical loads for maintaining. The power system 30 may include a conveniently holstered or other type of master switch 77 (FIG. 5) in a load master, a load control device, or other device for disconnecting the battery system 80, other power supplies, and/or generating devices during transport.

Figure 9:
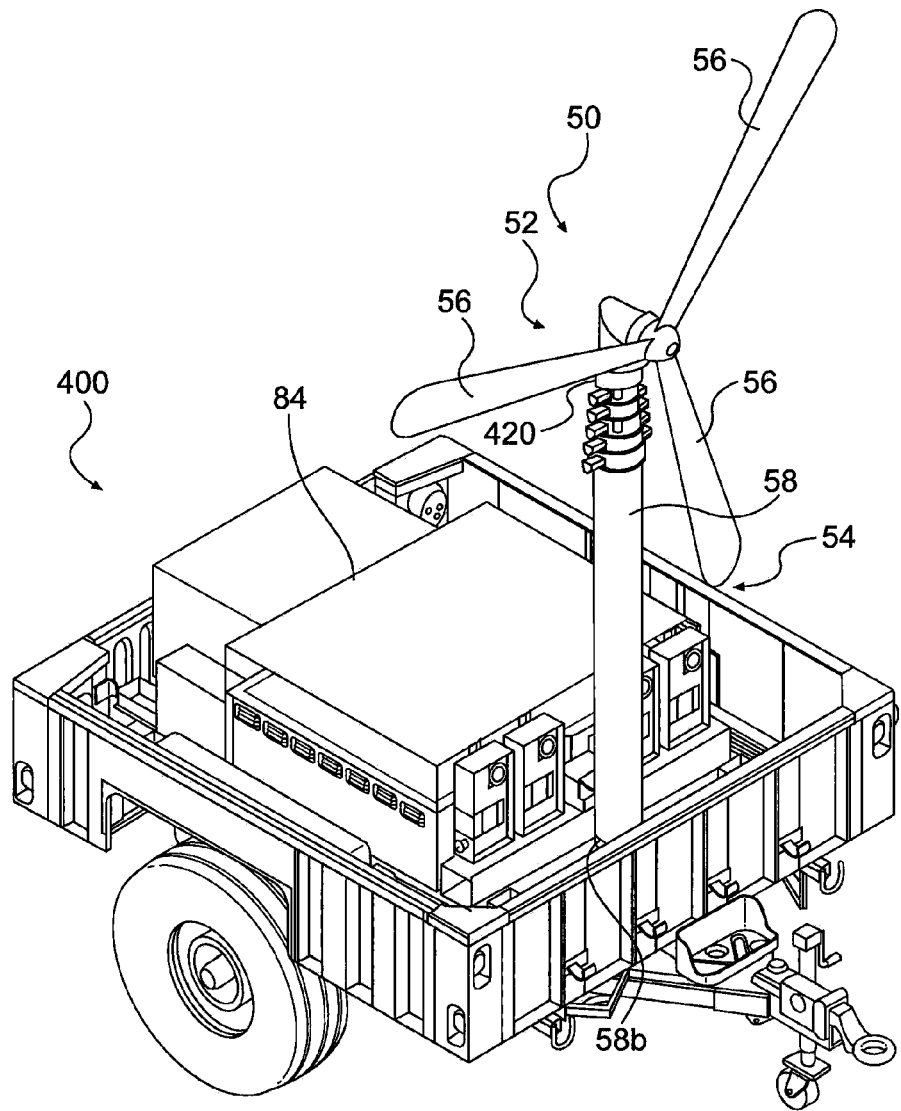
FIG. 9 is a perspective view of the exemplary trailer of FIG. 5 with the wind turbine in a vertically deployed configuration prior to extending the wind turbine to its full height.

The battery system 80 includes one or more batteries 82 (FIG. 19), e.g., lithium-ion batteries or lead-acid batteries (e.g., absorbed glass mat (AGM) batteries), for back-up system power. For example, the battery system 80 may include eight AGM batteries 82, e.g., having a total capacity of 1032 amphere-hours (Ah) and a total battery backup capacity of approximately 48 hours. Additional batteries 82 may add additional battery backup capacity to the power system 30. The power system 30 may be customized and configured to provide additional battery power using additional batteries. As shown in FIG. 9, the batteries 82 may be cooled with a roof 84, e.g., a tropical roof, on top of a housing for storing the batteries 82 of the battery system 80. The roof 84 may be raised above the housing to allow air to flow between the roof and the batteries 82. Low emissivity paint may be used to further cool the batteries 82 and other components. In addition, a fan, heat sink, or other passive and/or electrical and/or mechanical cooling systems 86 (FIG. 5) may be provided in the trailer 10 to cool, e.g., the battery system 80.

The fuel power generating device 90 may include, e.g., fuel cells, a natural gas driven generator, oil driven generator, propane driven generator, diesel fuel driven generator, gasoline driven generator, etc. The fuel power generating device 90 may have an auto-start/stop feature that allows the fuel power generating device 90 to conserve energy by automatically shutting off when power from the fuel power generating device 90 is not required and automatically re-starting when power from the fuel power generating device 90 is needed. The battery system 80 may provide power when the fuel power generating device 90 is not generating power. The fuel power generating device 90 may be connected to a fuel tank, e.g., an expandable pillow-style or bladder fuel tank capable of holding, e.g., 30 gallons of fuel.

Alternatively, the trailer 10 may include a temperature control system 88 FIG. 5), such as a cooling system 86 (FIG. 5), a heating system, and/or a ventilation system, and may be thermostatically controlled. The temperature control system 88 may be provided in the battery system 80. Alternatively, the temperature control system 88 may be provided in a compartment of the trailer 10 that houses the battery system 80, and/or in a separate compartment in the trailer 10. The temperature control system 88 may be coupled to the battery system 80 and/or other electronics in the trailer 10. For example, the temperature control system 88 may control the battery system 80 and/or the other electronics, e.g., to shut off the battery system 80 and/or the other electronics automatically if a temperature that is sensed by a sensor in the temperature control system 88 is above a particular threshold. The temperature control system 88 may be isolated from the electronics (e.g., the power system 30) so that dust is kept away from the electronics. The temperature control system 88 may include a compartment with a plurality of heat sinks and a fan that draws air across the plurality of heat sinks. The temperature control system 88 may also include an active or passive air circulation system, such as vents that allow air to enter and circulate inside the trailer 10 or a fan. Alternatively, a roof 84 may be storable in the trailer 10 and deployable when in use. The roof 84 may be made of canvas, metal, fabric, or other materials, and may cool and shade the trailer 10 and other deployed components of the trailer 10. As a result, less power may be necessary to maintain a lower temperature in the trailer 10.

Figure 3:
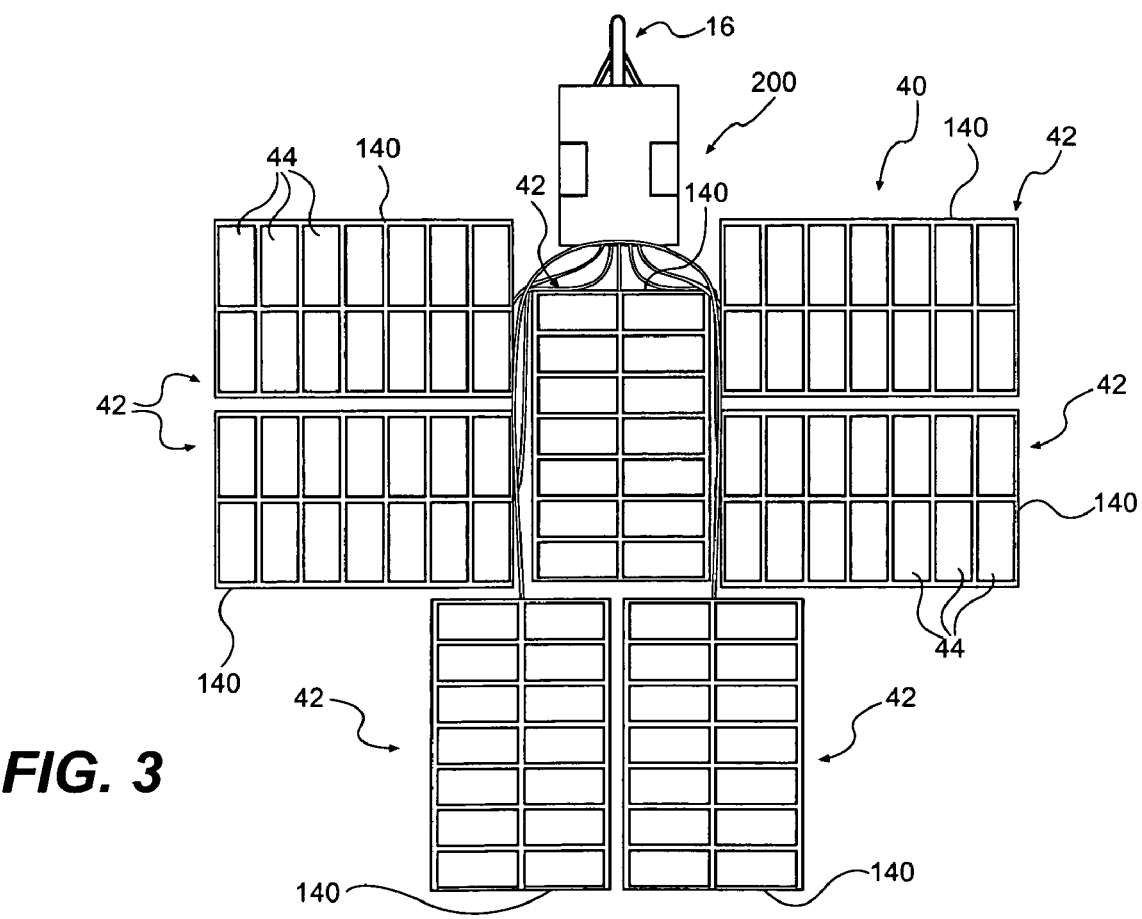
FIG. 3 is a perspective view of an exemplary disclosed trailer with a power system provided therein having deployed solar arrays.

The solar array 40 in the trailer 10 may include one or more sub-arrays 42. Each sub-array 42 may include one or more linked solar panels 44, e.g., four solar panels. FIG. 3 shows a trailer 200 including the solar array 40 with seven sub-arrays 42 positioned around the trailer 200. As shown, each sub-array 42 may include fourteen solar panels 44, and each sub-array 42 may be capable of providing a power output of, e.g., 30 to 910 watts. Thus, the entire solar array 40 may provide a power output of, e.g., approximately 6,300 watts. It is to be understood that each solar array 40 may include sub-array(s) 42 and solar panels 44 in other types of configurations other than the configuration shown in FIG. 3. For example, in certain embodiments, the solar array 40 may be modular, allowing the operator to customize the solar array 40 by mixing, matching, adding, and removing sub-arrays 42, solar panels 44, and/or individual PV modules in a sub-array 42 to achieve a higher or lower power requirement. When stored inside the trailer 10, the sub-arrays 42 may be rolled up, folded, folded about hinges, or otherwise put into a more compact condition for storage.

Figure 21:
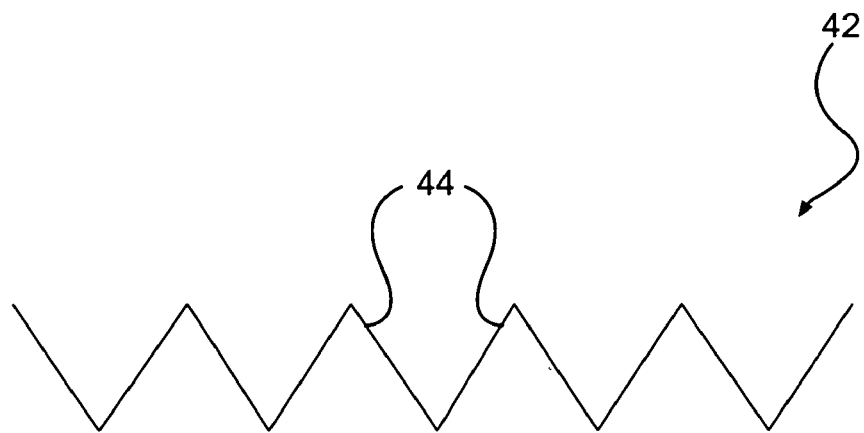
FIG. 21 is a side view of an exemplary disclosed sub-array of a solar array of the power system of FIG. 1 in a partially folded configuration.

Each sub-array 42 may be an accordion-type honeycomb photovoltaic array. Honeycomb sub-arrays are sturdy and durable since they include solar panels 44 that may be folded and that allow the sub-arrays to be modular. Each solar panel 44 may be connected to adjacent solar panels 44 via hinges. The accordion design of the sub-arrays 42, which is shown in FIG. 21, allows for storage of each sub-array 42 inside the trailer 10 by folding the sub-arrays 42 neatly and compactly. The accordion design also allows the sub-array 42 to be rapidly deployable. When deployed to generate solar power, the sub-arrays 42 may lie flat or in a partially-folded configuration as shown in FIG. 21. When stored, the sub-array 42 may be in a completely folded configuration. Alternatively, the sub-array 42 may be a thin-film sub-array. However, the honeycomb sub-array 42 may be more powerful, more sturdy, and more durable than the thin-film sub-array.

As shown in FIG. 3, the sub-arrays 42 may be thin-film sub-arrays included in one or more solar blankets 140 that may each provide a power output of approximately 30 to 910 watts. The solar blankets 140 may be flexible and waterproof and may weigh, for example, approximately 65 pounds. The solar blankets 140 may lie flat on the ground or hook on to the trailer 10 to be deployed at an angle facing the sun or attached to other surfaces. When folded, each solar blanket 140 may be 5 feet (length)×2.5 feet (width)×4 inches (depth). When deployed, each solar blanket 140 may be 18.5 feet (length)× 11.33 feet (width)×0.75 inches (depth). When fully deployed, the trailer 10 and the power system 30 may occupy a footprint space of approximately 48 feet×60 feet.

The solar panels 44 may be replaceable. For example, the hinges 49 (FIG. 22) connecting adjacent solar panels 44 may allow adjacent solar panels 44 to separate from each other, e.g., by allowing the solar panels 44 to separate from the hinges 49, by allowing the hinges 49 to separate into multiple connectable parts, etc. Alternately, the hinges 49 can be made of a flexible material such as Velcro, so that one solar panel 44 can easily be mechanically connected and disconnected from another. This can be reinforced with mechanical snaps or other devices (not shown). The flexible material hinge can be attached to or embedded within laminate layers or within a backing panel of solar panels 44. Electrically, the solar panels 44 can be connected and disconnected easily by using plug in or other electrical connectors between solar panels 44.

Figure 30:
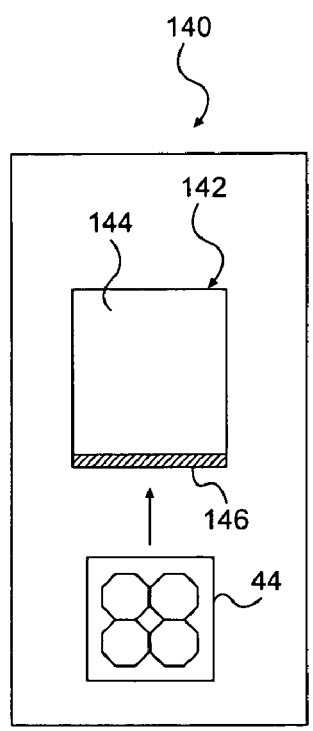
FIG. 30 is a schematic view of an exemplary disclosed solar blanket prior to insertion of a solar panel.
Figure 31:
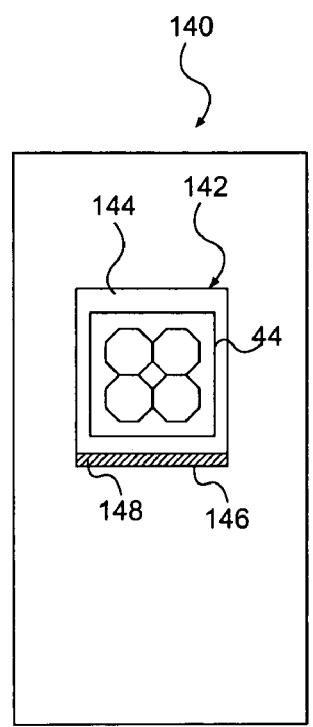
FIG. 31 is a schematic view of the solar blanket of FIG. 30 with the solar panel inserted in the solar blanket.
Figure 32:
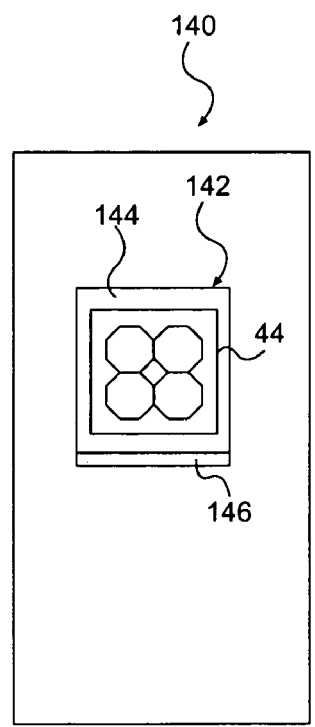
FIG. 32 is a schematic view of the solar blanket of FIG. 30 with the solar panel fastened inside the solar blanket.

As another example, when the solar panels 44 are provided in the solar blanket 140, the solar blanket 140 may be provided with a plurality pockets 142. One such exemplary pocket 142 is illustrated in FIGS. 30-32. In this embodiment, one or more solar panels 44 may be inserted into each pocket 142, and the pockets 142 may each include a panel 144, e.g., a transparent or translucent panel, through which the solar panels 44 may be visible. FIG. 30 shows the solar panel 44 outside the pocket 142 of the solar blanket 140 prior to insertion of the solar panel 44 into the pocket 142. FIG. 31 shows the solar panel 44 inserted into the pocket 142 so that it is visible through the panel 144 of the pocket 142. The pockets 142 may also include a fastener 146 for closing the pocket 142 to prevent the solar panels 44 from sliding out of the pockets 142. For example, the fastener 146 may include a flap 146 of material that includes Velcro 148 for closing the respective pocket 142. The solar panels 44 may include electrical conductors (not shown) that may exit the pocket 142 for connection with other solar panels 44 or downstream receiving components, or the electrical conductors of the solar panels 44 may connect to mating conductors formed within the individual pockets 142 as part of the blanket 140. Additionally, each solar panel 44 may be laminated from front to back and over the edges either with separate or continuous lamination. This will prevent sharp edges and mitigate the solar panels' 44 surface temperature for the user. FIG. 32 shows the solar panel 44 fastened inside the pocket 142 after folding over the flap 146 of material that includes Velcro 148 that holds the pocket 142 closed. As a result, individual solar panels 44 may be easily replaceable, e.g., if a solar panel 44 is broken or inoperable, instead of having to replace entire sub-arrays 42.

In yet an alternative embodiment, the trailer 10 may be configured to include a built-in base solar array in the form of a pancake-type stack of solar panels. In such an arrangement, for example, square solar cells may unfold in a plurality of directions from a central base solar cell. The integral solar cells unfolded from the trailer 10 may be used alone to provide power to the power system 30, or the sub-arrays 42 may be coupled to one or more of the unfolded solar cells to provide greater power generation. The solar array 40 may include one or more female leads or connectors 46 (FIG. 22) to be plugged into the power system 30 to avoid shock hazards during operation.

Figure 22:
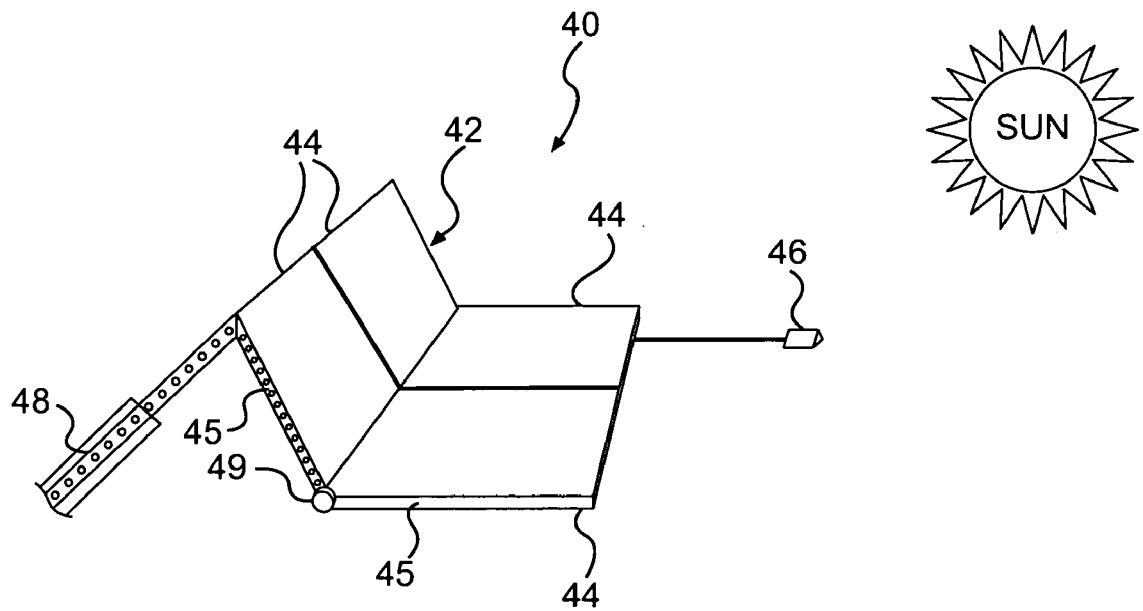
FIG. 22 is a perspective view of a sub-array of a solar array of an exemplary disclosed power system in an at least partially deployed configuration.

As shown in FIGS. 21 and 22, the solar array 40 may be capable of being inclined at any angle ranging from horizontal to vertical. As shown in FIG. 22, each solar panel 44 of the solar array 40 may be formed by attaching (e.g., bonding) PV material to a backing panel 45, such as a rigid corrugated panel. As a result, when folded up, the solar array 40 may be easily transported. When deployed, as shown in FIG. 22, the positioning of the solar panels 44 may be adjustable using an adjustable support system, e.g., one or more adjustable struts 48 or another corrugated backing panel 45, one or more hinges 49 or flexible corrugated panels, etc. For example, as shown in FIG. 22, the positioning of the adjustable strut 48 (or another rigid corrugated panel) and the hinge 49 (or a flexible corrugated panel) may adjust an angle at which the solar panels 44 of the solar array 40 may be positioned. The backing panels 45 allow the solar array 40 to float and may be lightweight and rigid to protect the PV material from bending. Alternatively, the backing panels 45 with the PV material may be integrated into a solar blanket 140 made of a canvas or other material or deployed without such integration.

The wind turbine system 50 may include one or more wind turbines 52, which can be either vertical axis or horizontal axis wind turbines. Each wind turbine 52 may be capable of producing a power output of, e.g., approximately 400 watts, but actual power output may vary with wind conditions, etc. The wind turbine may trickle charge the battery system 80 at lower wind speeds.

As shown in FIG. 1, the trailer 10 may include two wind turbines 52, which may be removable from the interior of the trailer 10, mounted off the trailer 10, and then, before traveling to a new location, put back into the interior of the trailer 10. The wind turbine 52 may include a body 54 and a plurality of blades 56. The body 54 may include a tire anchor mounting apparatus 57 and a height-adjustable (telescoping) pole 58. For example, the wind turbine 52 may be adjusted to have a height as low as approximately 10 feet and as high as approximately 20 to 30 feet. The tire anchor mounting apparatus 57 includes a platform 57a that may lie underneath the wheels 12 of the trailer 10. The platform 57a is perpendicular to the telescoping pole 58 and allows the telescoping pole 58 to extend vertically.

With reference to FIG. 1, the blades 56 are attached to the telescoping pole 58, which is then attached to the tire anchor mounting apparatus 57. The height of the telescoping pole 58 may be adjusted as desired, and the trailer 10 may be positioned so that the wheels 12 lie on top of the platform 57a of the tire anchor mounting apparatus 57. The wind turbine body 54 and blades 56 may be quickly and easily assembled, allowing for ease of deployment. In addition, the wind turbine body 54 and blades 56 may be quickly and easily disassembled and stored in the trailer 10. For example, the blades 56 may be disconnected from the wind turbine body 54, and the telescoping pole 58 may be collapsed to shorten the telescoping pole 58 to a more compact transport configuration. Optionally, the blades 56 may also be collapsed (e.g., folded or pivoted) so that the blades 56 are also positioned in a more compact transport configuration. The body 54 and blades 56 are strong and durable and designed for outdoor use. The wind turbine body 54 and blades 56 may fit neatly into the trailer 10 for storage and transport.

In another embodiment, as shown in FIG. 4, a trailer 300 may include the wind turbine 52, and at least a portion of the wind turbine 52 may be permanently integrated into the trailer 300. The wind turbine 52 may include the body 54 and blades 56 of the wind turbine 52 shown in FIG. 1, but instead of having a tire anchor mounting apparatus 57, the telescoping pole 58 may be mounted to the trailer 300, e.g., the floor 26 of the trailer 300 or a mounting platform or support base connected to the trailer frame 22. FIG. 4 shows the wind turbine 52 disassembled and stowed in the trailer body 20. As shown in FIG. 4, the blades 56 may remain attached to the telescoping pole 58 when stowed in the trailer body 20. Therefore, to assemble the wind turbine 52, the wind turbine body 54 is mounted to the trailer 300. Then, the height of the telescoping pole 58 may be adjusted as desired.

In yet another embodiment, as shown in FIGS. 5-11, a trailer 400 may include the wind turbine 52, which may be entirely permanently integrated into the trailer 400. The wind turbine 52 may include the body 54 and blades 56 of the wind turbine 52 shown in FIG. 1, but instead of having a tire anchor mounting apparatus 57, the wind turbine 52 includes a first hinge 420 connecting the wind turbine blades 56 to the telescoping pole 58 and a second hinge 422 connecting the telescoping pole 58 to the trailer 400, e.g., the floor 26 of the trailer 400 or a mounting platform or support base connected to the trailer frame 22. Optionally, the telescoping pole 58 may be connected to an auto-deploy mast system 410 (FIGS. 15-18), which automatically controls the deployment and retraction of the wind turbine 52.

Figure 6:
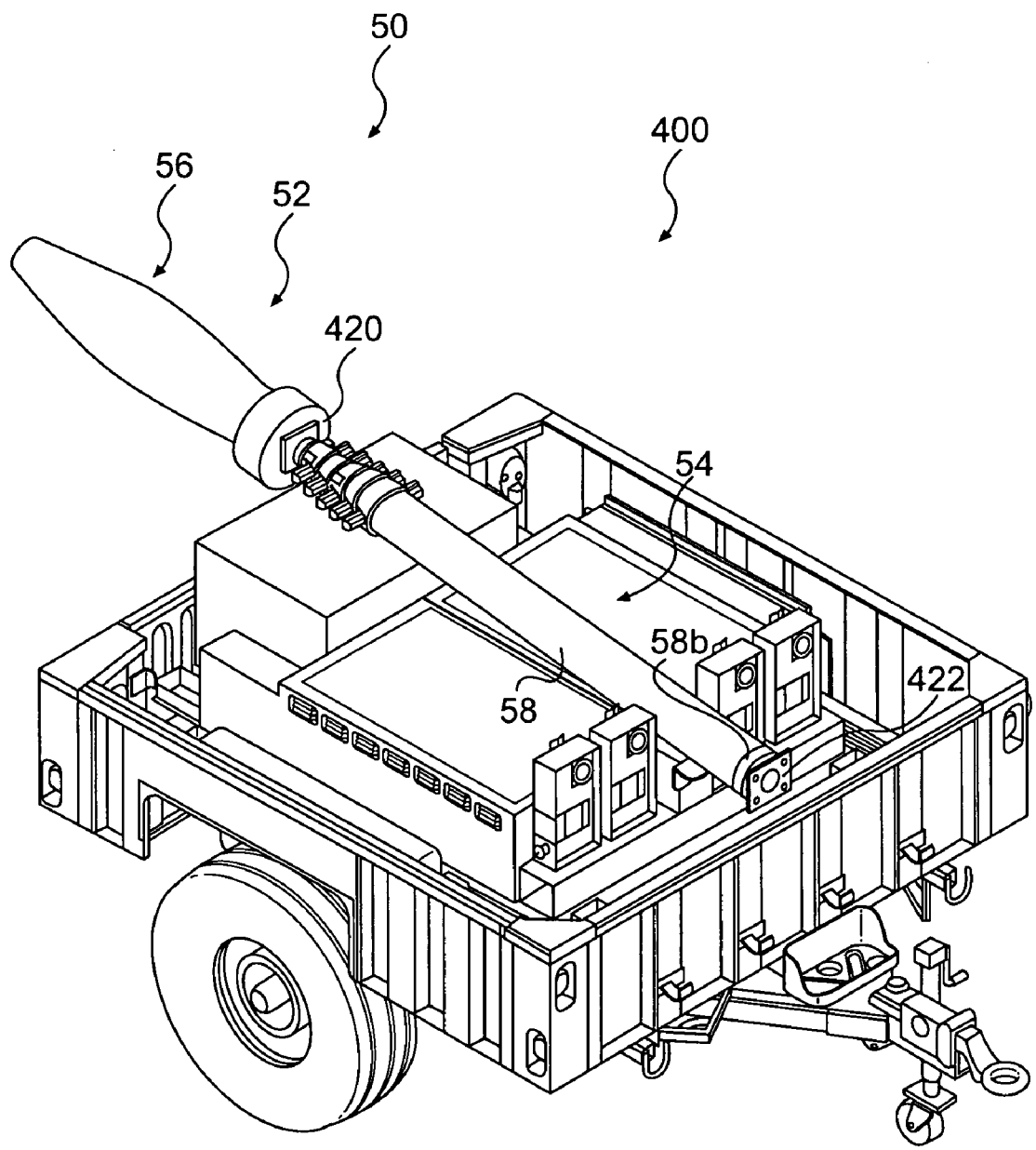
FIG. 6 is a perspective view of the exemplary trailer of FIG. 5 with the wind turbine in a first partially deployed configuration.

The deployment of the wind turbine 52 is shown in FIGS. 5-9 and may be performed manually by an operator or automatically by the auto-deploy mast system 410. FIG. 5 shows the wind turbine 52 in a fully retracted configuration, e.g., during transport. In this position, the blades 56 of the wind turbine 52 are positioned so that the blades 56 each extend in the same direction toward a lower end 58b of the telescoping pole 58 and overlie the telescoping pole 58, which is in an approximately horizontal position. Then, the blades 56 of the wind turbine 52 are pivoted around the first hinge 420 until the wind turbine 52 is positioned in a first partially deployed configuration, as shown in FIG. 6. In this position, the blades 56 are positioned so that they are aligned with and extend away from the lower end 58b of the telescoping pole 58.

Figure 7:
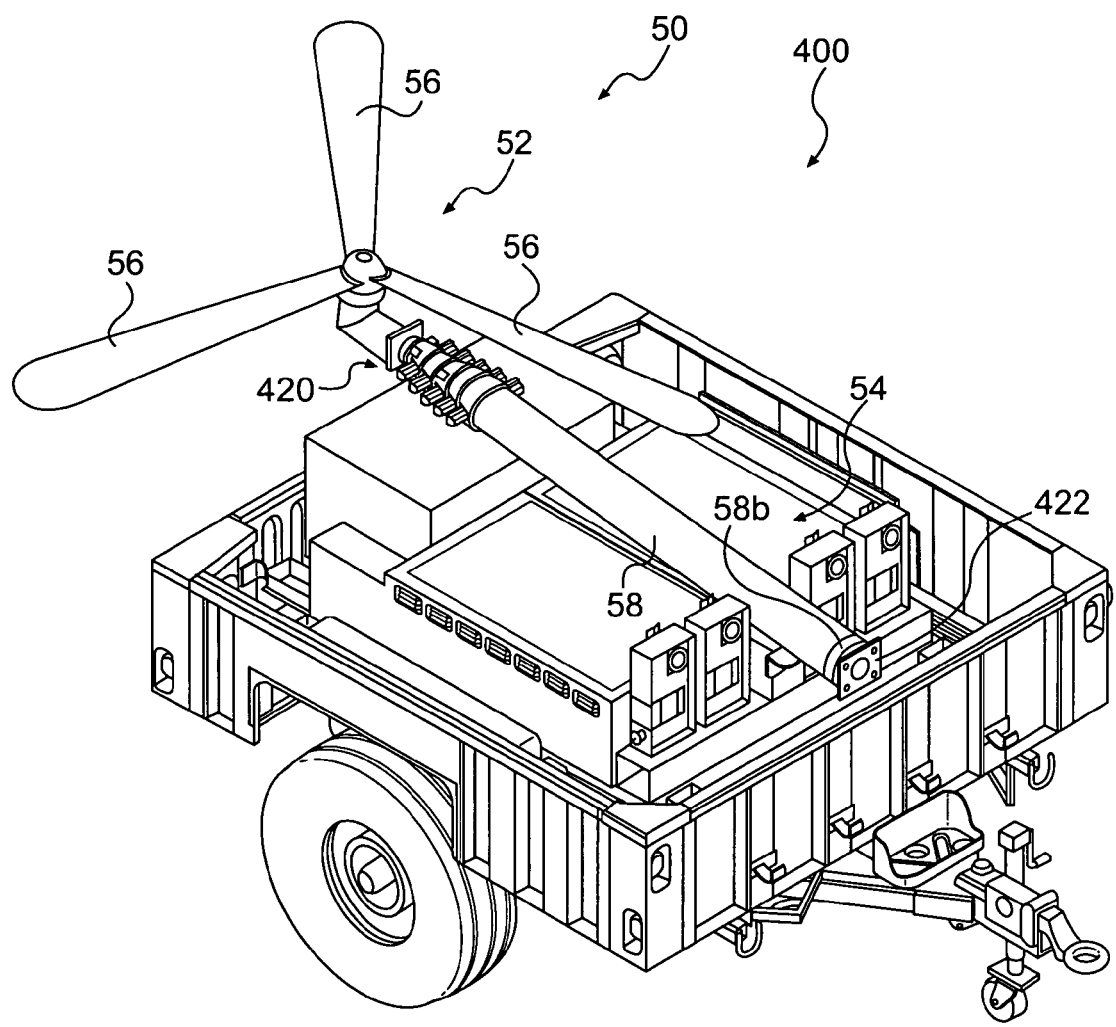
FIG. 7 is a perspective view of the exemplary trailer of FIG. 5 with the wind turbine in a second partially deployed configuration.
Figure 8:
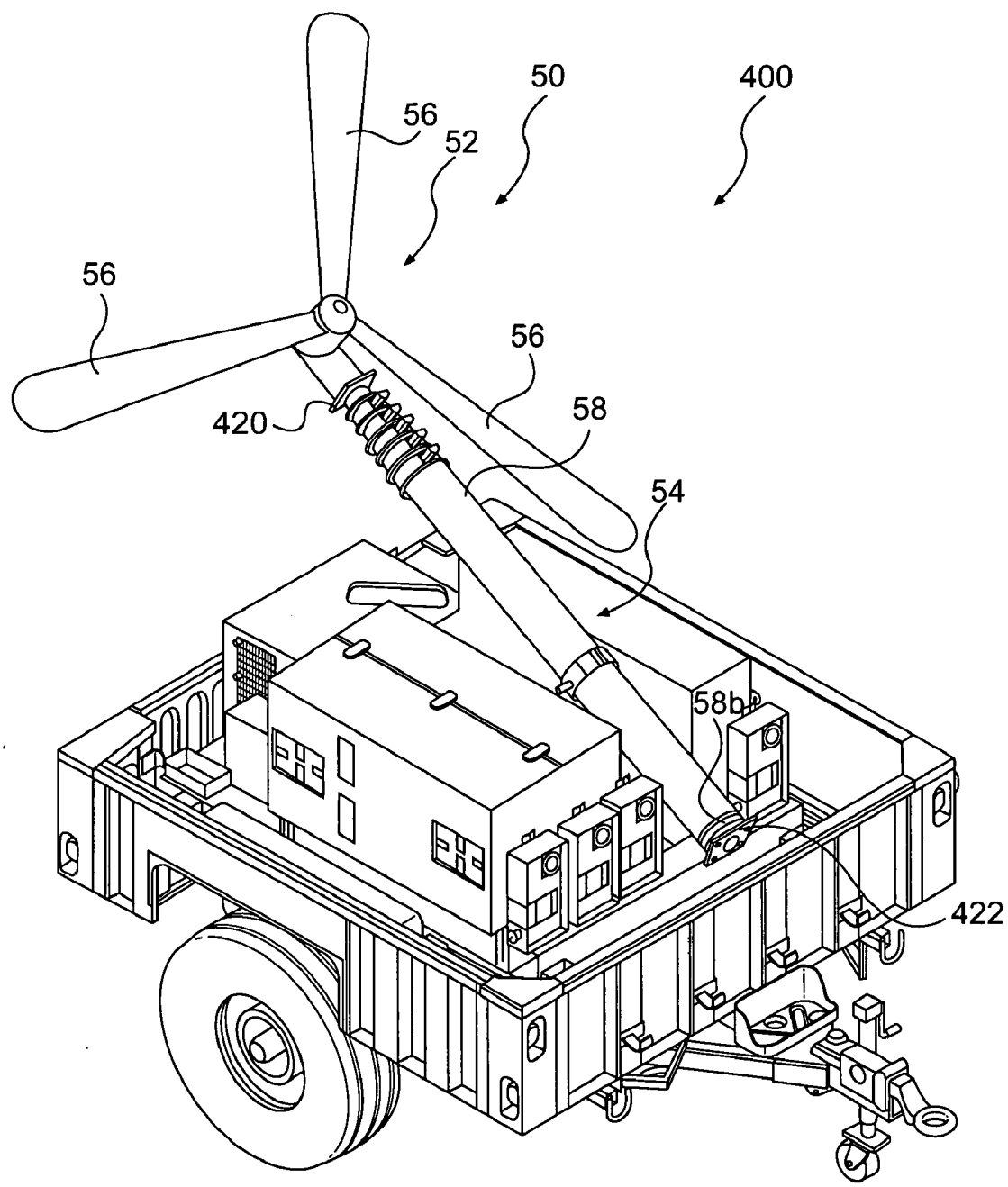
FIG. 8 is a perspective view of the exemplary trailer of FIG. 5 with the wind turbine in a third partially deployed configuration.

Next, as shown in FIG. 7, the blades 56 are spread out, e.g., approximately 360°, around an axis of the wind turbine 52 and then tilted so that the axis of the wind turbine 52, about which the blades 56 rotate, is perpendicular to the telescoping pole 58. In this position, the wind turbine 52 is in a second partially deployed configuration. Then, the telescoping pole 58 is raised to a vertical position by pivoting the telescoping pole 58 about the second hinge 422 or other pivot point near the lower end 58b of the telescoping pole 58. FIG. 8 shows the wind turbine 52 in a third partially deployed configuration with the telescoping pole 58 in a partially raised position. FIG. 9 shows the wind turbine 52 in a fully deployed configuration with the telescoping pole 58 in a vertical position.

Figure 10:
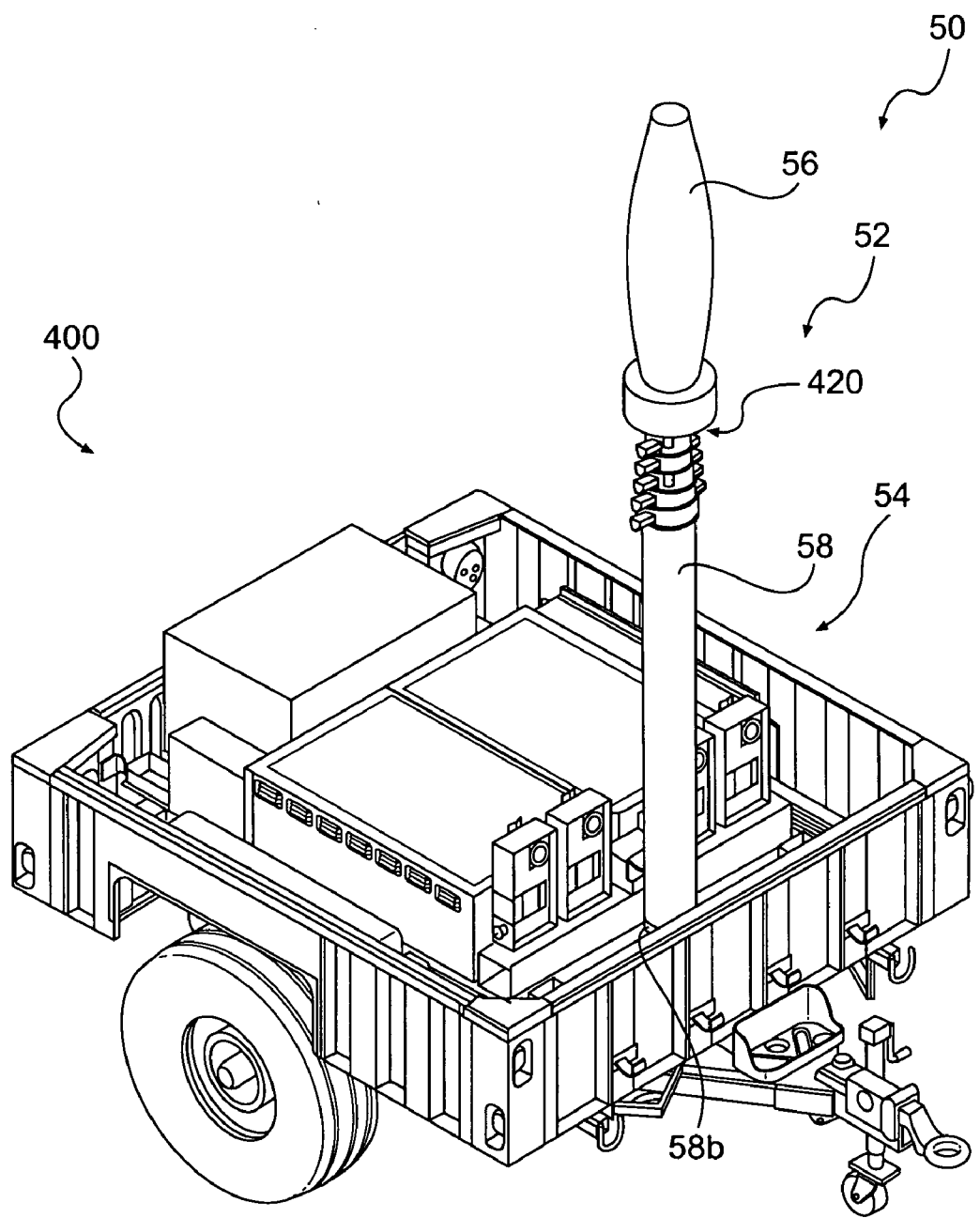
FIG. 10 is a perspective view of the exemplary trailer of FIG. 5 with the wind turbine in a first partially retracted configuration with a vertical axis wind turbine.

The retraction of the wind turbine 52 is shown in FIGS. 9-11 and 5. When the wind turbine 52 is in the fully deployed configuration as shown in FIG. 9, the blades 56 may be positioned so that they extend upward from the telescoping pole 58. In this position, the wind turbine 52 in a first partially retracted configuration, as shown in FIG. 10.

Figure 11:
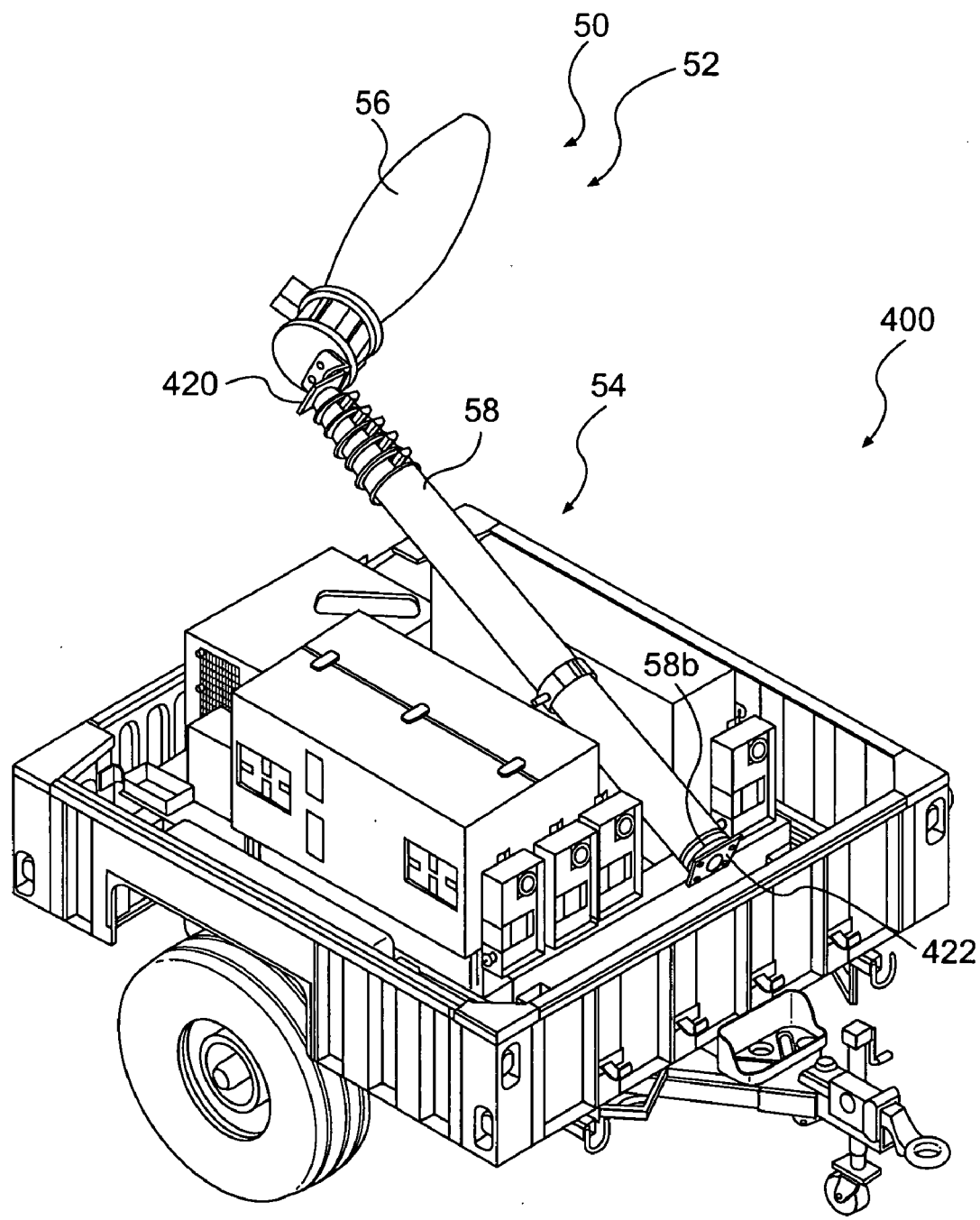
FIG. 11 is a perspective view of the exemplary trailer of FIG. 5 with, the vertical axis wind turbine in a second partially retracted configuration.

Then, the telescoping pole 58 is lowered to the approximately horizontal position shown in FIG. 5 by pivoting the telescoping pole 58 about the second hinge 422 or other pivot point near the lower end 58b of the telescoping pole 58. While the telescoping pole 58 is lowered, the blades 56 of the wind turbine 52 are pivoted around the first hinge 420 until the blades 56 each extend in the same direction and overlie the telescoping pole 58, as shown in FIG. 5. FIG. 11 shows the wind turbine 52 in a second partially retracted configuration, and FIG. 5 shows the wind turbine 52 in the fully retracted configuration.

Figure 12:
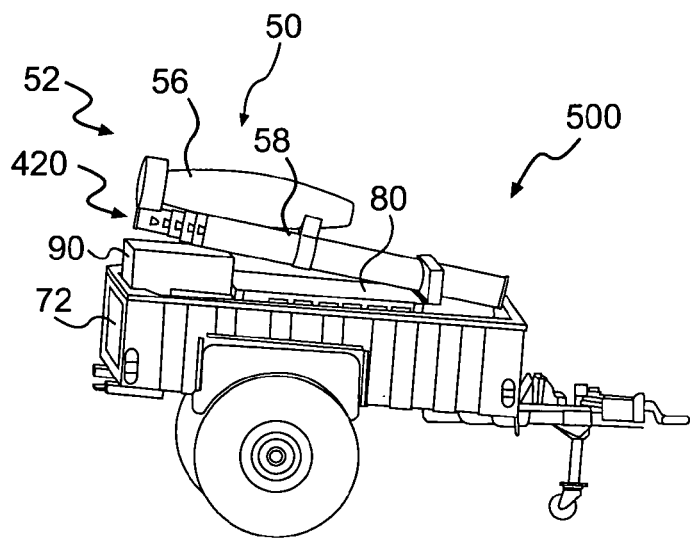
FIG. 12 is a perspective view of yet another exemplary disclosed trailer having a power system provided therein with a fully retracted wind turbine in transport mode.
Figure 13:
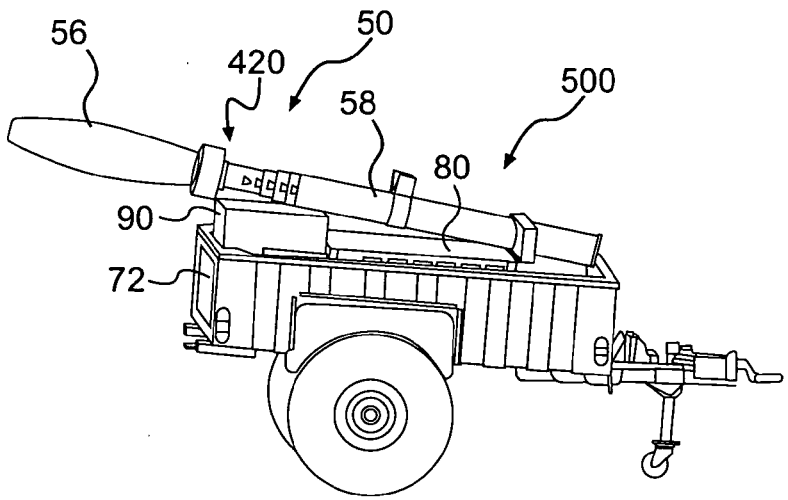
FIG. 13 is a perspective view of the exemplary trailer of FIG. 12 with the wind turbine in a first partially deployed configuration.
Figure 14:
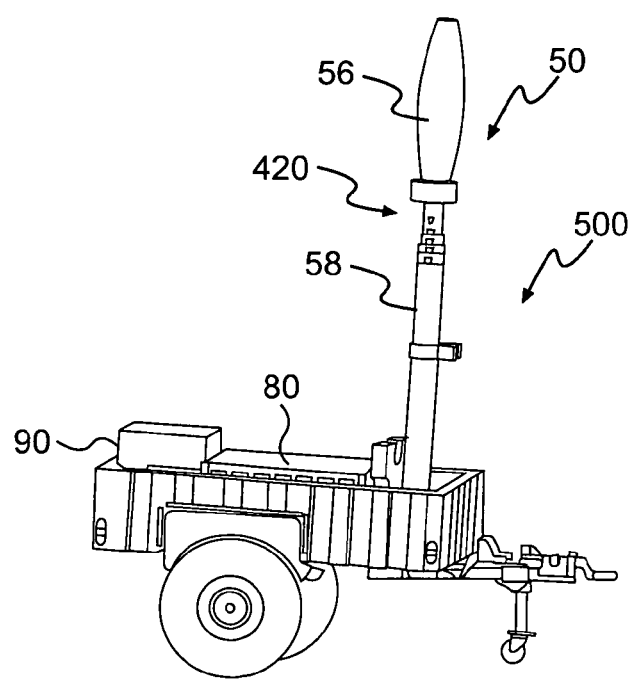
FIG. 14 is a perspective view of the exemplary trailer of FIG. 12 with the wind turbine in a second partially deployed configuration.

In a further embodiment, as shown in FIGS. 12-14, a trailer 500 may include the wind turbine 52, which is a vertical axis wind turbine, and the wind turbine 52 may be entirely permanently integrated into the trailer 500, as shown in FIGS. 5-11. The deployment of the wind turbine 52 as shown in FIGS. 12-14 is similar to the deployment of the wind turbine 52 as shown in FIGS. 5-11, except that the spreading of the blades 56 around the axis of the wind turbine 52 may occur after the telescoping pole 58 is raised to the vertical position, as shown in FIG. 14. Furthermore, the telescoping pole 58 may be connected to an auto-deploy mast system 410 (FIGS. 15-18), which automatically controls the deployment and retraction of the wind turbine 52. The solar array 40 may be stored in and deployable from the trailer 500.

FIGS. 15-18 show the wind turbine 52 and an embodiment of the auto-deploy mast system 410. The auto-deploy mast system 410 may adjust the length of the telescoping pole 58 pneumatically, hydraulically, mechanically (e.g., chain-driven, with a winch or crank, automatic or manually powered), etc. For example, the telescoping pole 58 may include one or more telescoping pole sections that are slidably movable with respect to a non-telescoping pole section and to each other. The telescoping pole sections may be connected to an actuator that may extend the pole sections away from the non-telescoping pole section to allow the telescoping pole 58 to increase in length.

Figure 15:
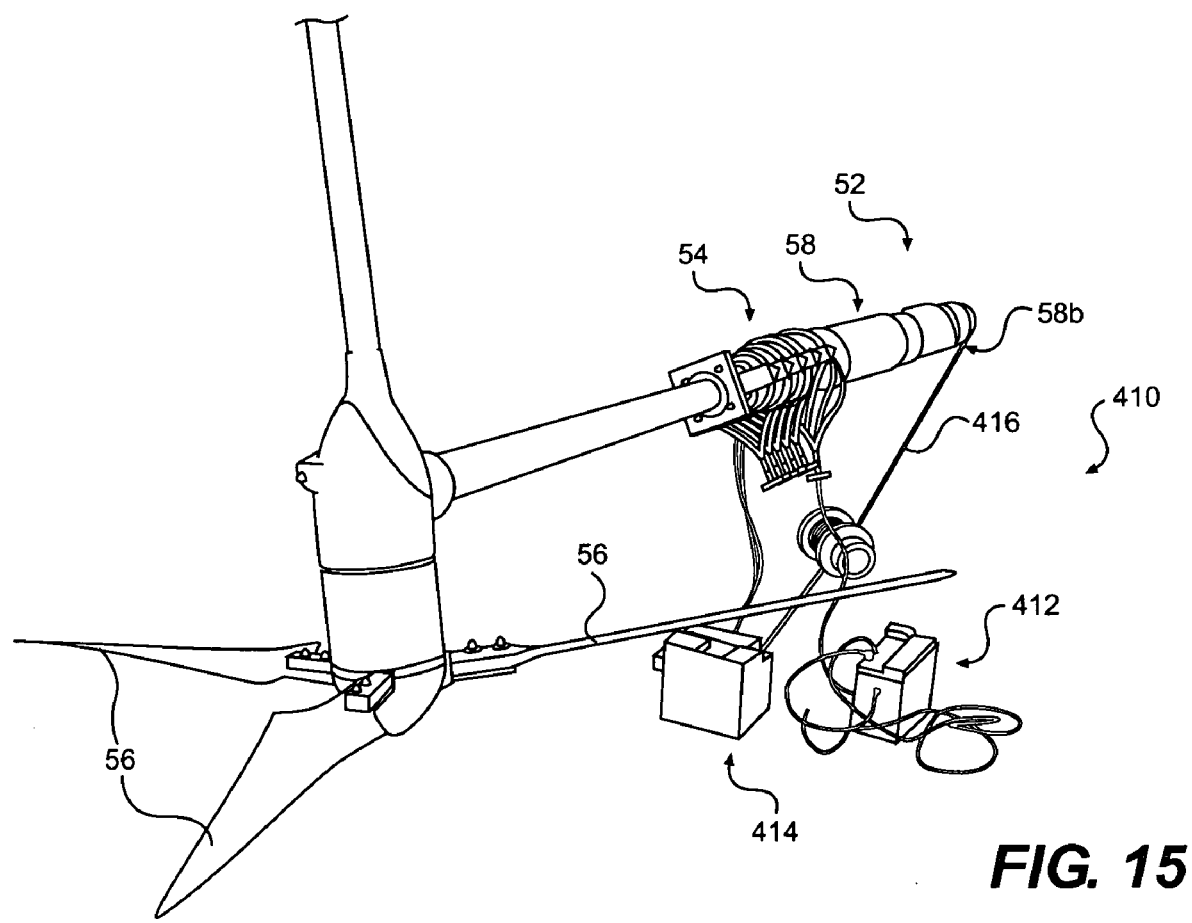
FIG. 15 is a perspective view of an exemplary disclosed power system having a wind turbine and an auto-deploy mast system.
Figure 16:
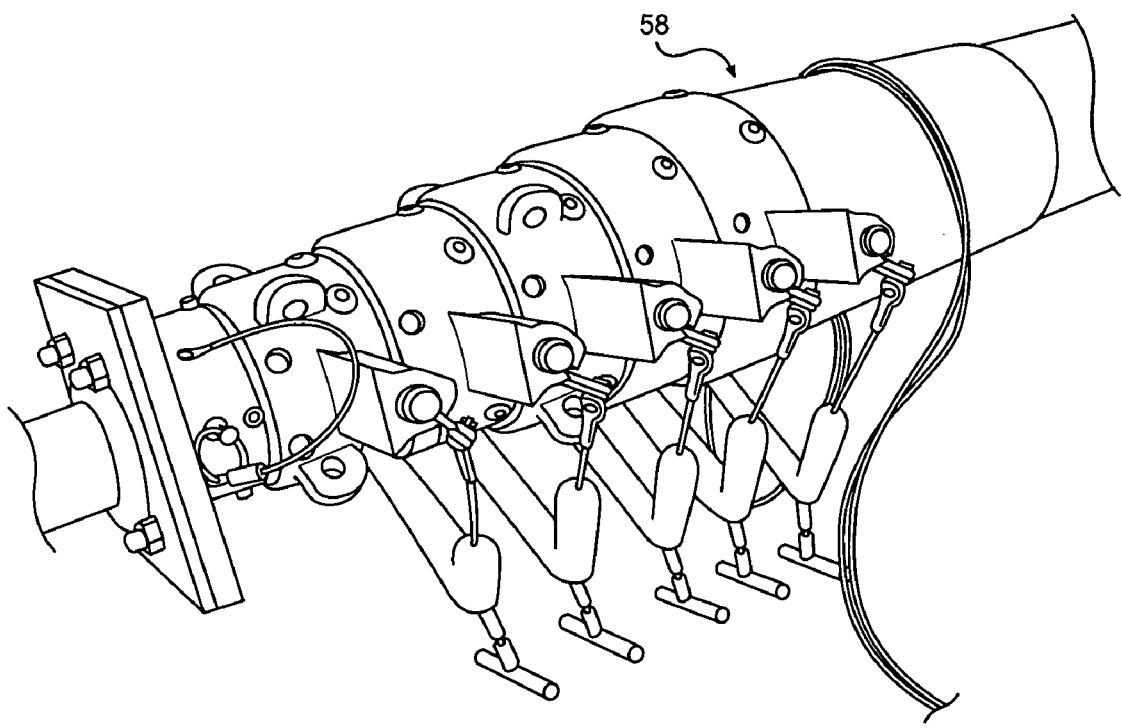
FIG. 16 is a sectional view of the wind turbine and auto-deploy mast system of FIG. 15.

FIG. 15 shows the wind turbine 52 in a retracted position with the telescoping pole 58 at the approximately horizontal position and the auto-deploy mast system 410 including a battery 412, a winch 414, and a cable 416 connecting the winch 414 to the lower end 58b of the telescoping pole 58. FIG. 16 shows the telescoping pole 58 in the retracted position and a plurality of communication lines connecting the telescoping pole 58 and the auto-deploy mast system 410 that allow the auto-deploy mast system 410 to control the lengthening and shortening of the telescoping pole 58.

Figure 17:
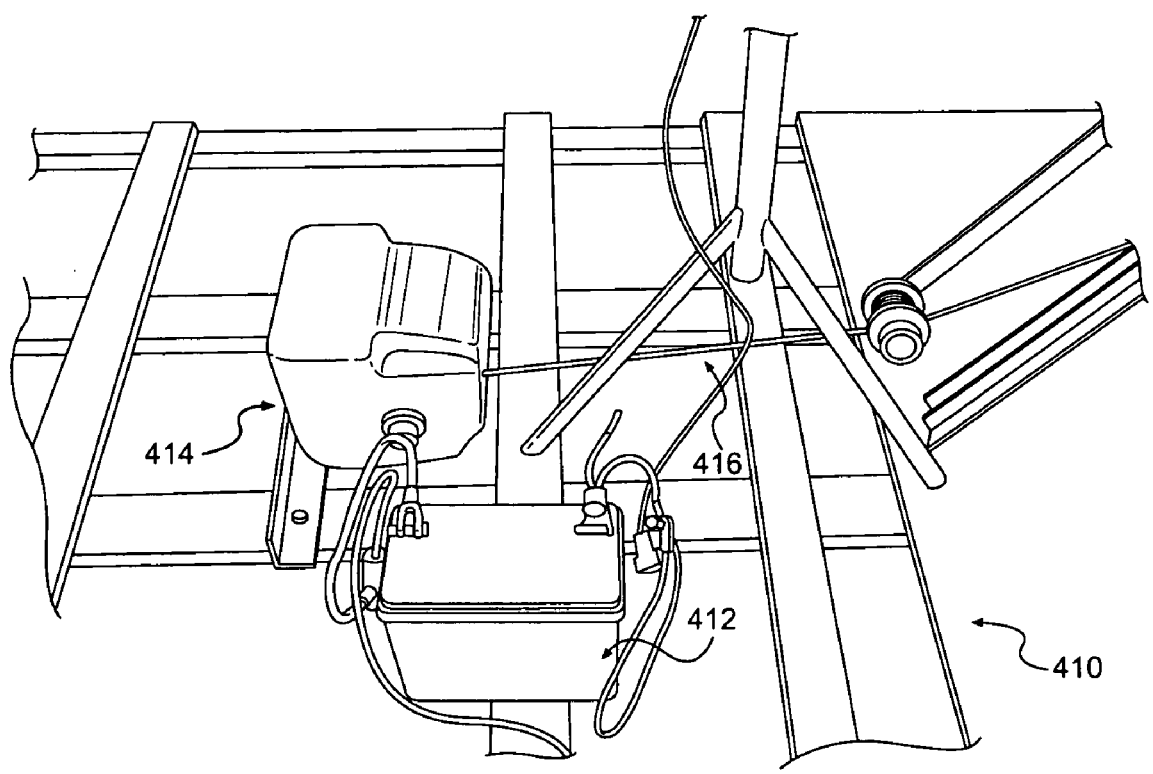
FIG. 17 is a sectional view of the wind turbine and auto-deploy mast system of FIG. 15.
Figure 18:
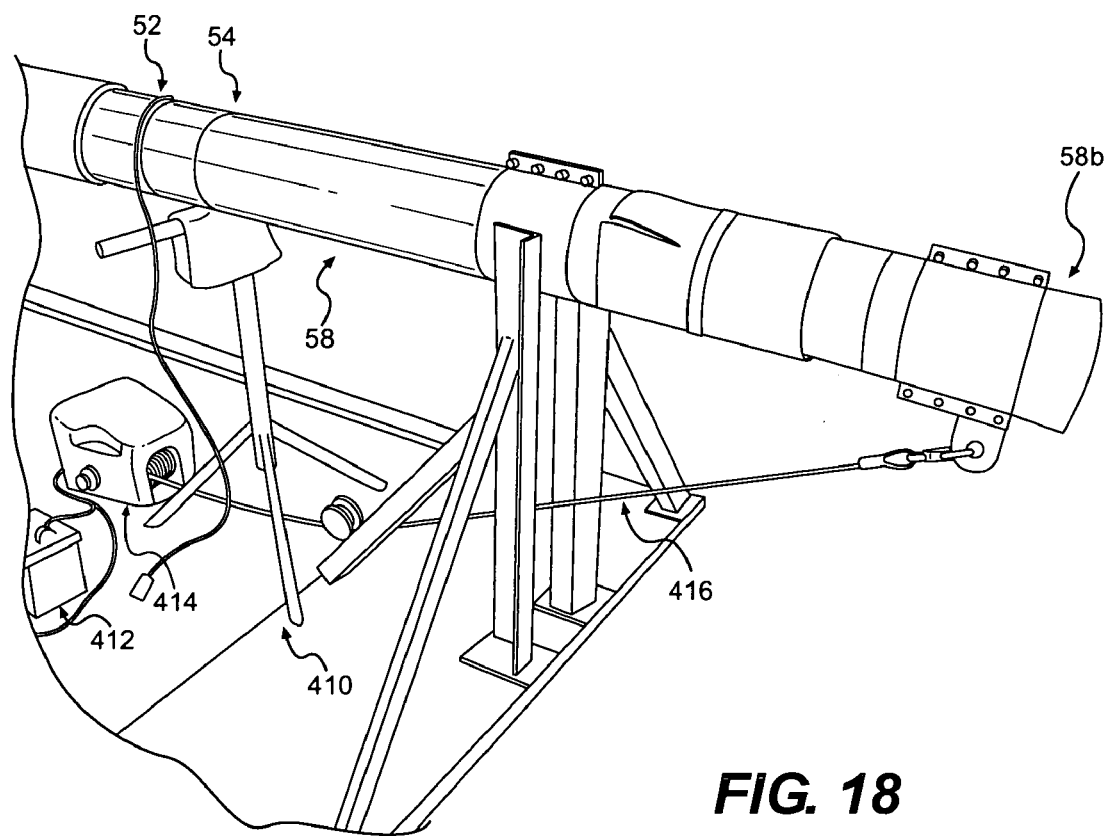
FIG. 18 is a sectional view of the wind turbine and auto-deploy mast system of FIG. 15.

FIGS. 17 and 18 show the battery 412 supplying power to the auto-deploy mast system 410 and the winch 414 for controlling the length of the rope or cable 416 connected to the lower end 58b of the telescoping pole 58. The telescoping pole 58 may pivot about a pivot point on the non-telescoping pole section near the lower end 58b of the telescoping pole 58. When the winch 414 decreases the length of the cable 416, the lower end 58b of the telescoping pole 58 may move closer to the winch 414, thereby forcing the telescoping pole 58 to pivot about the pivot point in one direction and rise toward the vertical position. When the winch 414 increases the length of the cable 416, the lower end 58b of the telescoping pole 58 may move away from the winch 414, thereby allowing the telescoping pole 58 to pivot about the pivot point in the opposite direction and move toward the approximately horizontal position shown in FIGS. 15-18.

Figure 19:
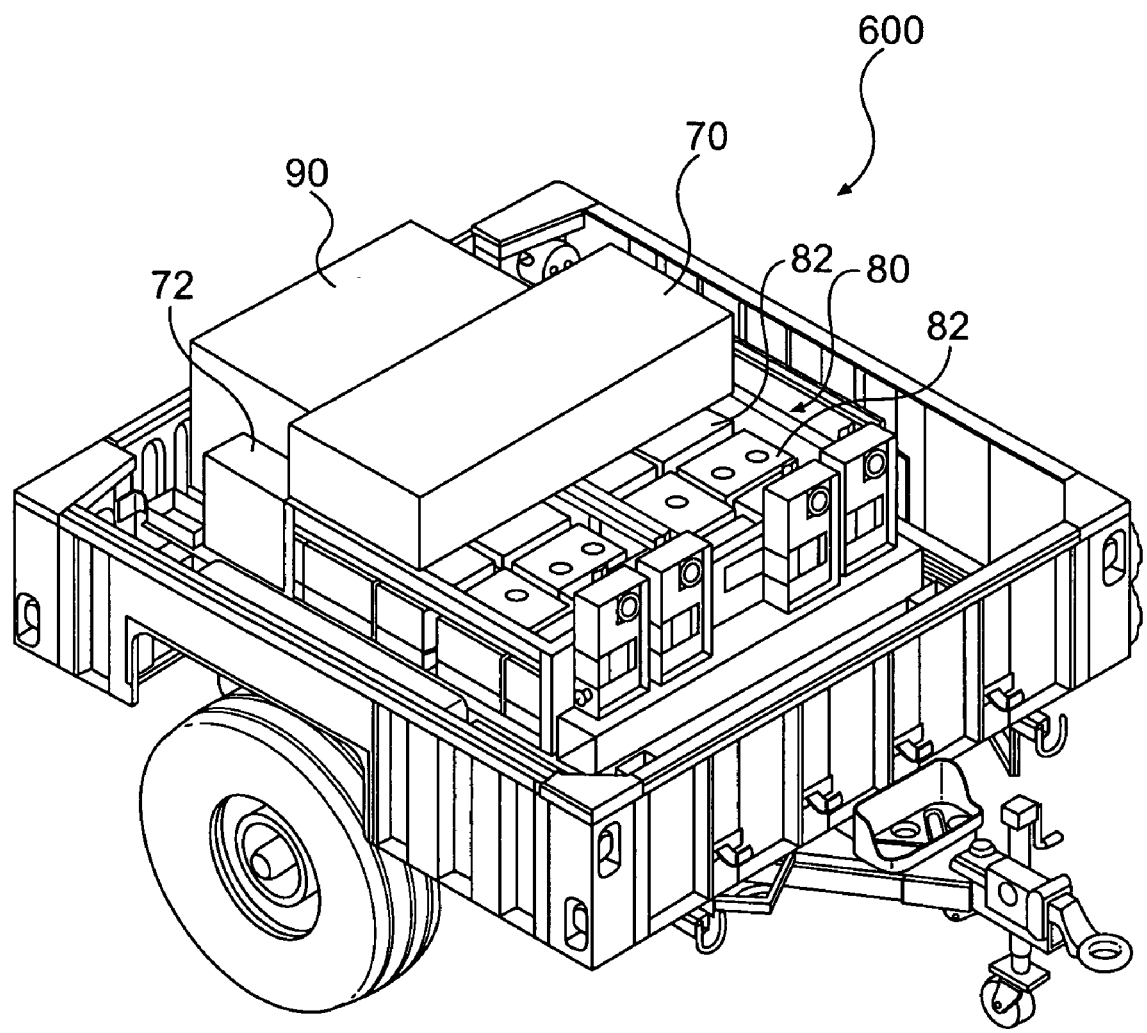
FIG. 19 is a perspective view of a further exemplary disclosed trailer having a power system provided therein.
Figure 20:
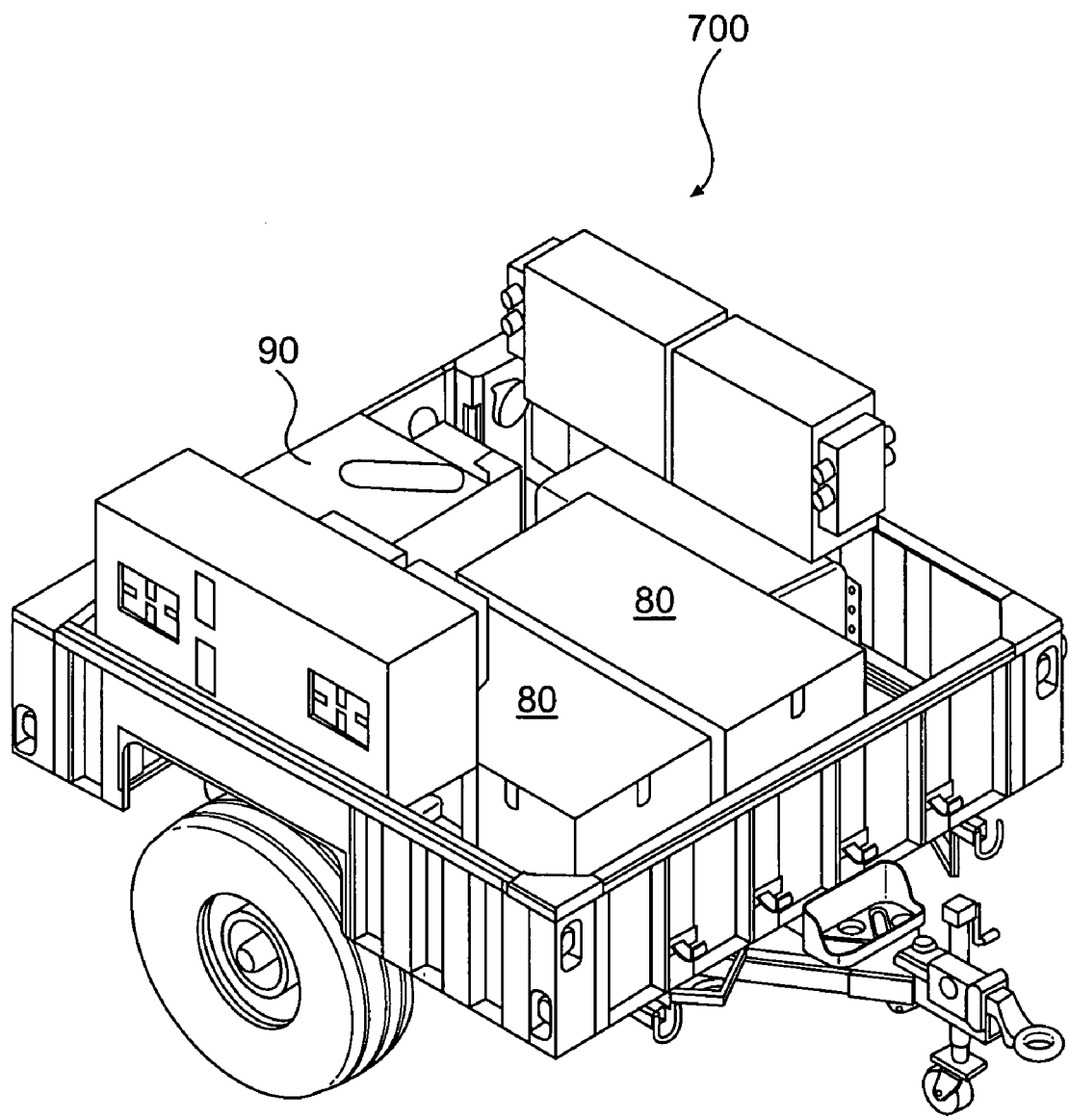
FIG. 20 is a perspective view of another further exemplary disclosed trailer having a power system provided therein.

In other alternate embodiments shown in FIGS. 19 and 20, a trailer 600, 700 may provide the components of the power system 30 in different configurations.

Figure 23:
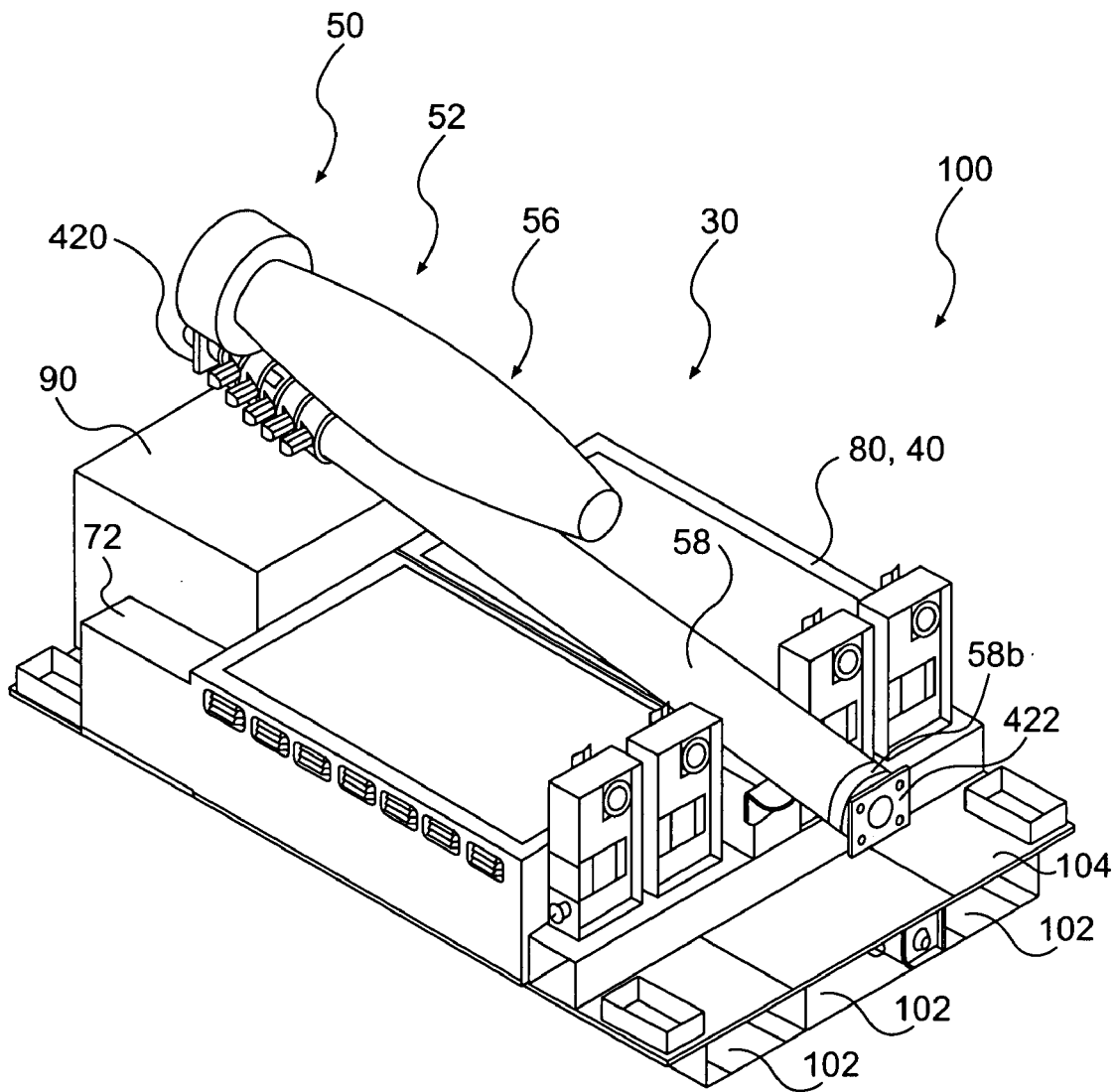
FIG. 23 is a perspective view of an exemplary disclosed skid with a power system including a wind turbine in a retracted configuration.
Figure 24:
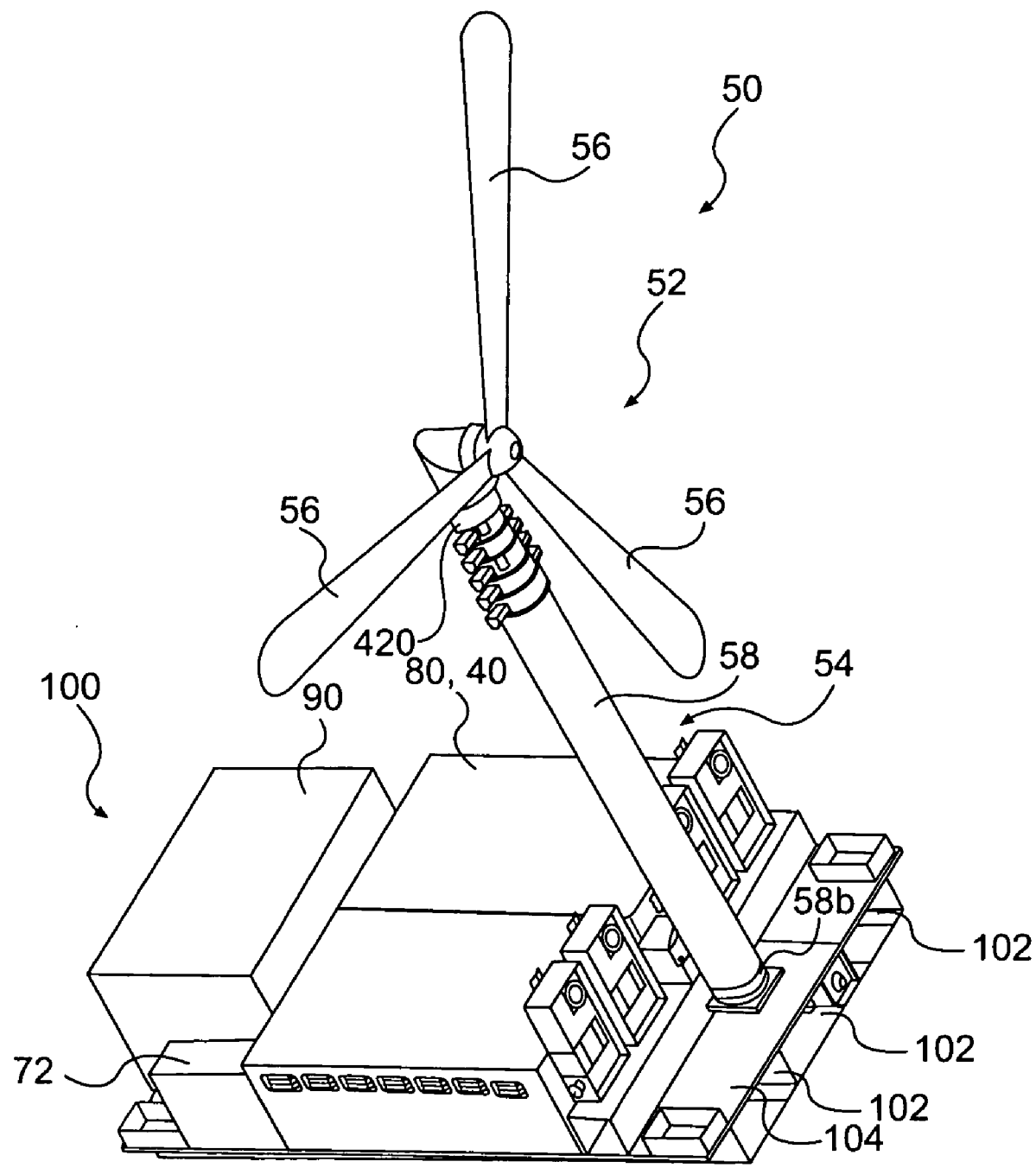
FIG. 24 is a perspective view of the skid of FIG. 23 with the wind turbine in a deployed configuration.

Alternatively, the components of the power system 30 described above may be placed on a skid 100, as shown in FIGS. 23 and 24. The skid 100 may be stored in the trailer 10 (or 10a, etc.) so that the trailer 10 may transport the skid 100. The skid 100 may also be removable from the trailer 10. FIGS. 23 and 24 show the skid 100 after being removed from the trailer 10. For example, the skid 100 may include a plurality of channels 102 for receiving respective tines of a forklift truck so that the forklift truck may lift and transport the skid 100, e.g., to load and unload the skid 100 from the trailer 10. Some or all of the components of the power system 30 described above, e.g., the solar array 40, the wind turbine system 50, the inverter 70, the battery system 80, the fuel power generating device 90, the auto-deploy mast system 410 (FIGS. 15-18), etc., may be stored on and/or formed integral to the skid 100. The skid 100 may include a platform 104 on top of the channels 102, and some or all of the components of the power system 30 described above may be provided on top of the platform 104.

In one embodiment, as shown in FIGS. 23 and 24, the skid 100 may include the wind turbine 52, and at least a portion of the wind turbine 52 may be permanently integrated into the skid 100. As shown in FIGS. 23 and 24, the wind turbine 52 may be entirely permanently integrated into the skid 100. In FIG. 23, the wind turbine 52 is in a retracted configuration, and in FIG. 24, the wind turbine 52 is in a deployed configuration. The skid 100 may be formed of materials that are strong enough to support the components of the power system 30 stored in and/or formed integral to the skid 100. The skid 100 may also provide compartments for storing equipment and/or fuel. For example, a fuel tank for storing fuel may be formed integral to the skid 100. The compartments, such as the fuel tank, may be formed of a relatively lightweight material.

Figure 25:
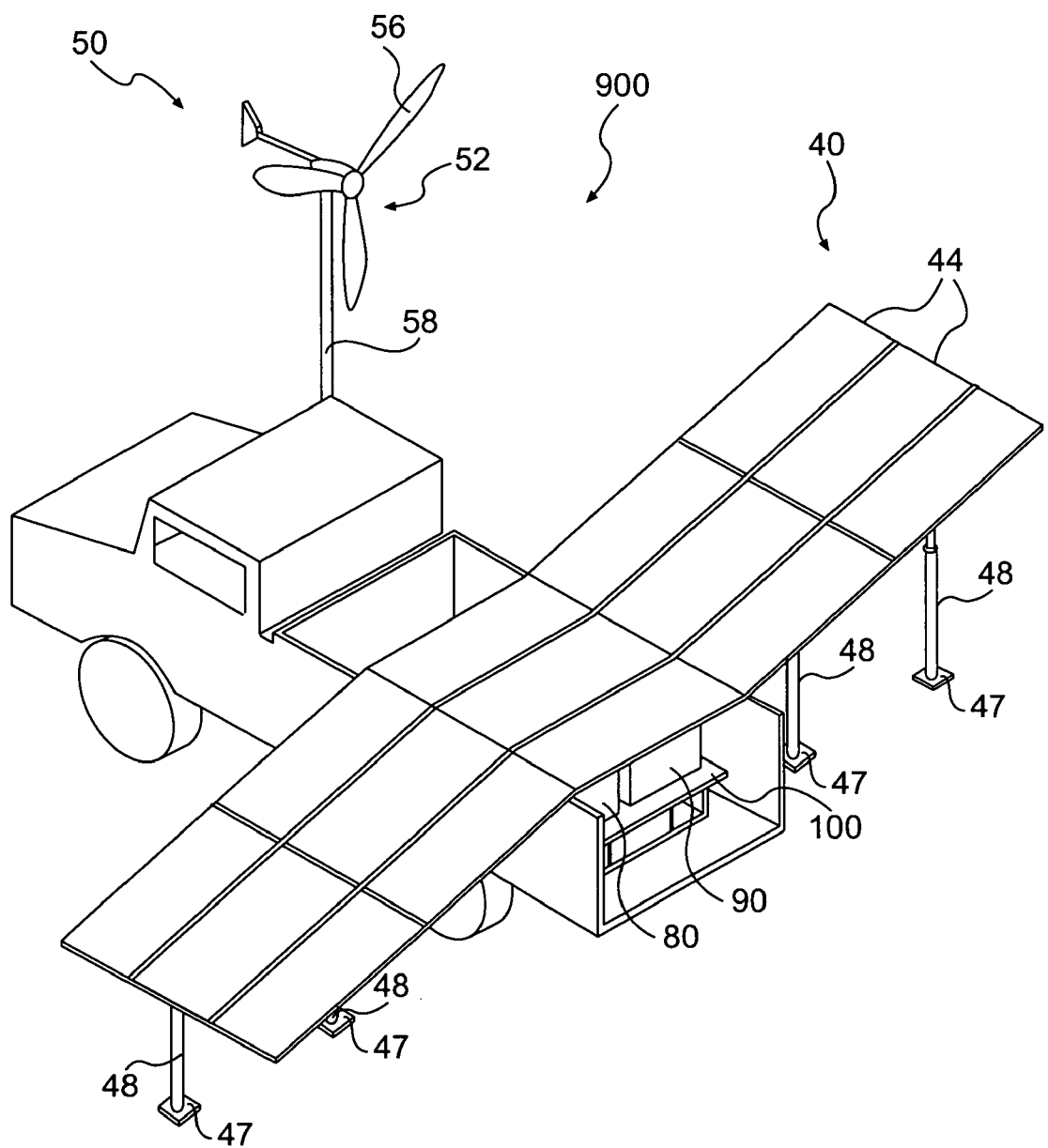
FIG. 25 is a perspective view of an exemplary disclosed pick-up truck with a skid and a power system including a wind turbine and a solar array in the deployed configurations.
Figure 26:
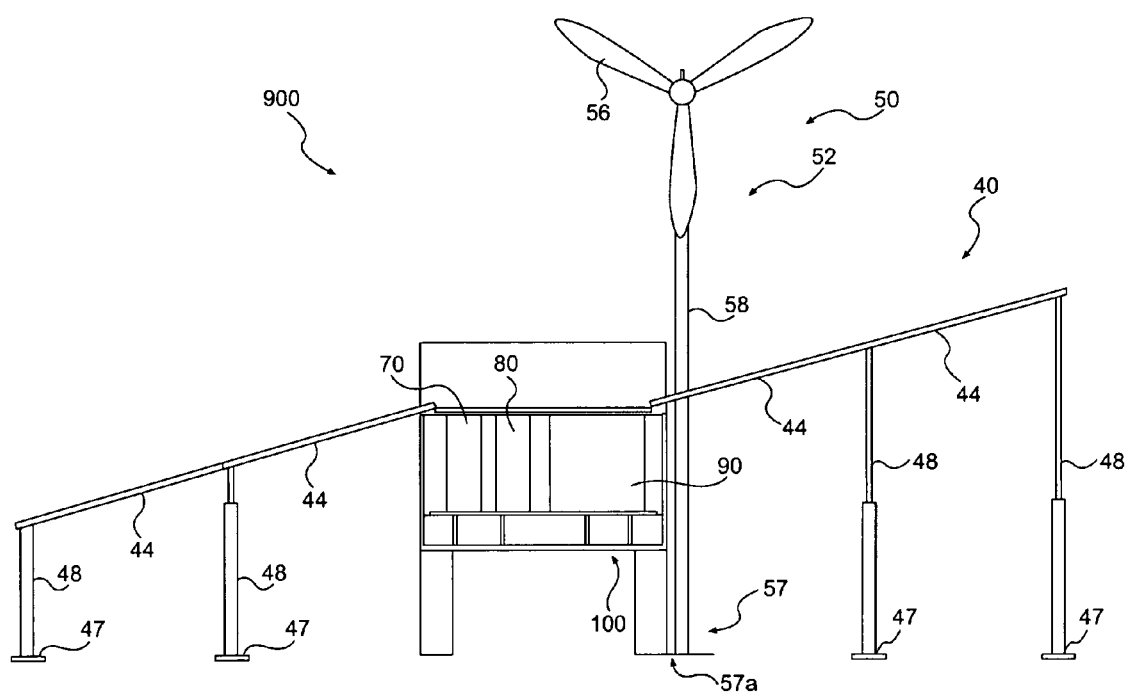
FIG. 26 is an end view of the pick-up truck of FIG. 25.

The skid 100 may be stored in another type of vehicle. For example, as shown in FIGS. 25 and 26, the skid 100 may be stored in and removable from a pick-up truck 900, e.g., a bed of the pick-up truck 900 or other loading area of a vehicle. FIGS. 25 and 26 show the wind turbine system 50 and solar array 40 in the deployed configurations. The wind turbine system 50 with the tire anchor mounting apparatus 57 and/or the solar array 40 may be stored on and deployable from the pick-up truck 900 or the skid 100. The solar panels 44 of the solar array 40 may be connected to respective ends of a plurality of adjustable struts 48, and the other ends of the adjustable struts 48 may be connected to foot members 47 that rest on the ground. The heights of the adjustable struts 48 may be adjusted to alter the height and incline of the solar panels 44. The pick-up truck 900 may include a canvas or other type of top to cover the components stored in the bed of the pick up truck 900. Alternatively, the skid 100 may be omitted and the components described above may be provided in the bed of the pick-up truck 900 without the skid 100.

Figure 27:
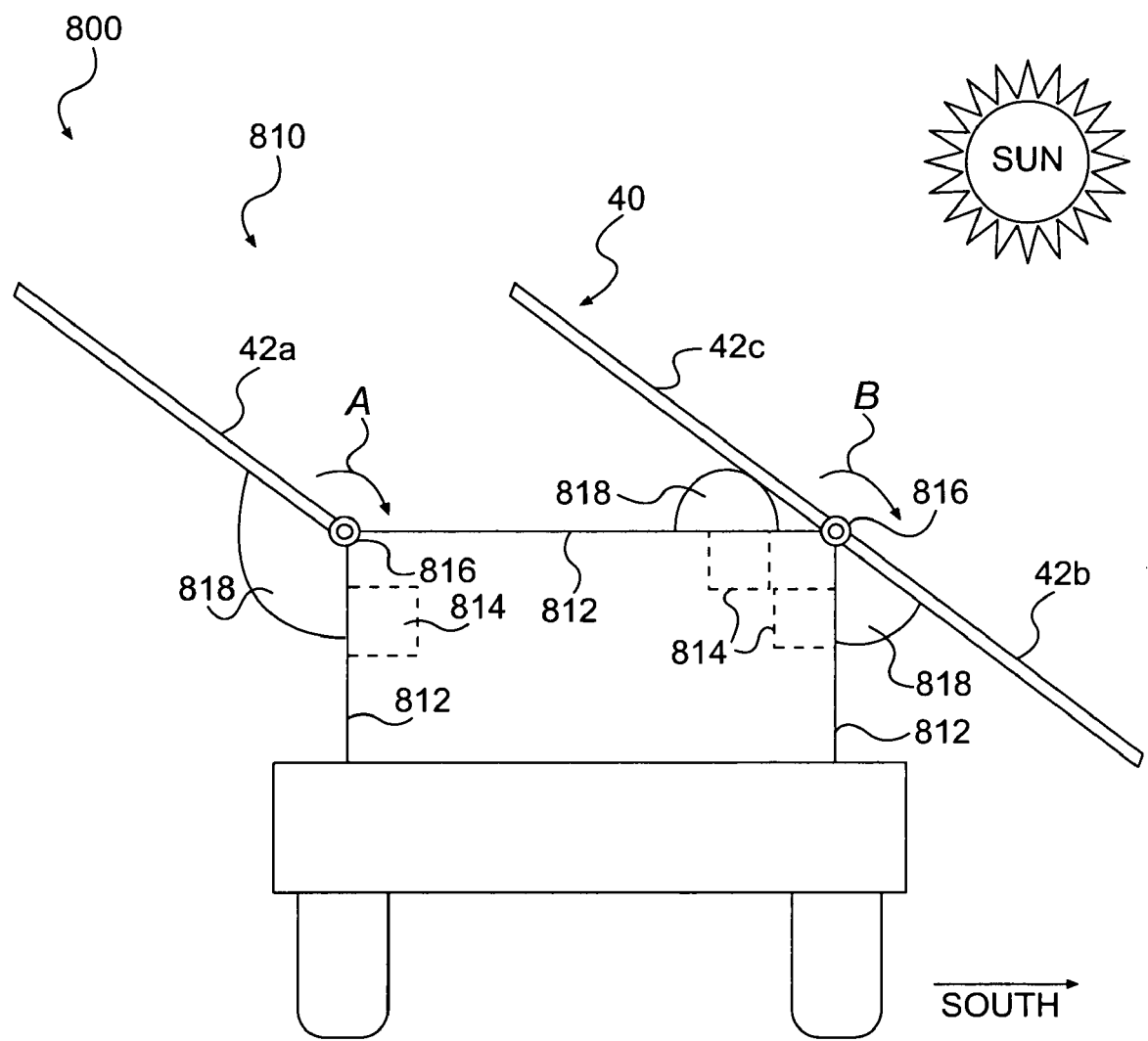
FIG. 27 is a side view of a trailer with a power system including an exemplary disclosed unfolding panel system for a solar array.
Figure 28:
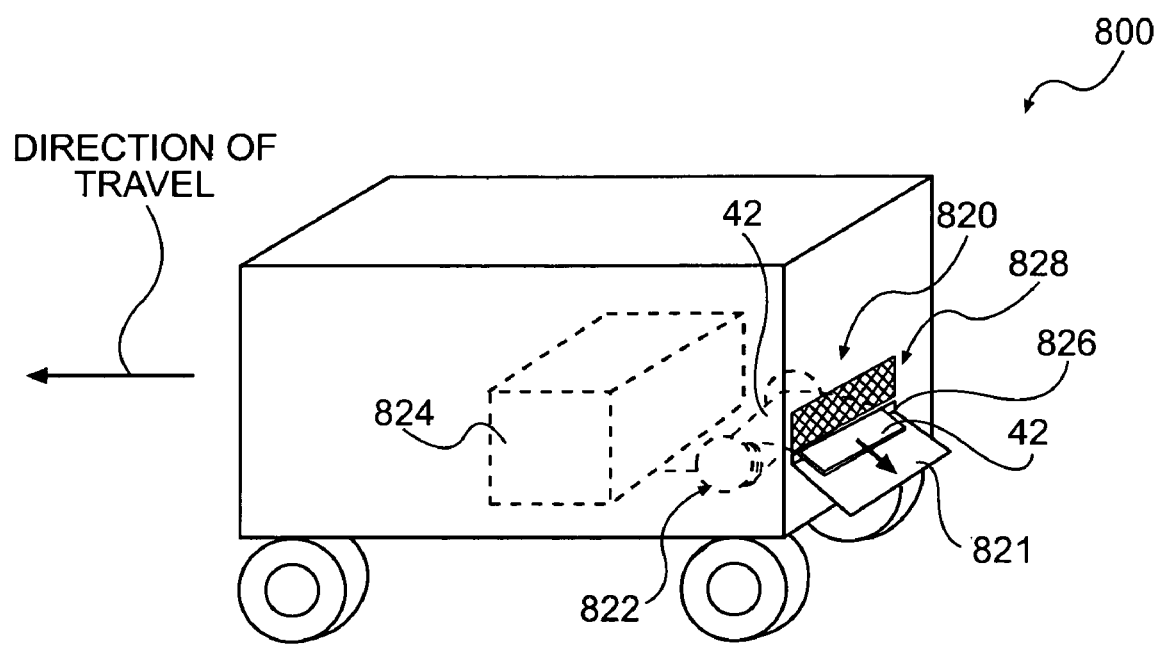
FIG. 28 is a perspective view of a trailer with a power system including an exemplary disclosed roller deployment system for a solar array.

In alternate embodiments, as shown in FIGS. 27 and 28, the solar array 40, which includes one or more sub-arrays 42, may be deployed automatically from a structure, e.g., a skid, a container (e.g., a freight container), a vehicle (e.g., a pickup truck, a trailer 800, etc.), or other structure. Deployment of the solar array 40 may be initiated, e.g., based on a signal from a remote control, a controller, or the operator via the dashboard or the control panel 72.

FIG. 27 shows an unfolding panel system 810 configured to unfold one or more sub-arrays 42. The unfolding panel system 810 may be attached to corner blocks or other portions of the trailer 800, such as mounting surfaces 812. The unfolding panel system 810 may be slightly smaller than the trailer 800 so that it may be stored inside the trailer 800. Before deployment of the sub-arrays 42, the sub-arrays 42 are in their stored positions so that a topmost sub-arrays 42 (sub-array 42a) is folded over the other solar panels. In this stored position, a back side of the topmost solar panel is positioned as the top surface of the stack of sub-arrays 42 and protects the stack of sub-arrays 42. The unfolding panel system 810 may involve two or more sub-arrays 42. For a three sub-array system, for example, the unfolding panel system 80 deploys the sub-arrays 42 as follows:

First, the trailer 800 may be positioned so that that the solar panels 44 of the sub-arrays 42 face South when deployed. A first sub-array 42a may be deployed (unfolded) using a driving mechanism 814 in the rotational direction of arrow A. The driving mechanism 814 may be a motor, hydraulic device, or pneumatic device located at or near a hinge 816 connecting the sub-array 42a to the mounting surfaces 812. After the first sub-array 42a is deployed, a locking mechanism connected to the hinge 816 may lock the first sub-array 42a into position so that the first sub-array 42a is prevented from falling.

Then, an inflatable bladder 818 is mounted to a side of the first sub-array 42a and/or or the mounting surfaces 812. After the first sub-array 42a is deployed (and/or locked in place), the inflatable bladder 818 inflates under the deployed first sub-array 42a to stabilize it. Alternatively, a mechanical or other type of stabilization system may be used instead of the inflatable bladder 818.

A second sub-array 42b and a third sub-array 42c may also be provided. The driving mechanism 814, the hinge 816 and locking mechanism, and the inflatable bladder 818, as described above in connection with the first sub-array 42a, may also be provided for each of the second and third sub-arrays 42b, 42c as described below. The second sub-array 42b is deployed in a similar fashion to the first sub-array 42a in the rotational direction of arrow B, e.g., using the driving mechanism 814, the hinge 816 and locking mechanism, and/or the inflatable bladder 818 associated with the second sub-array 42b. After the second sub-array 42b is deployed, the third sub-array 42c is uncovered. The third sub-array 42c is then deployed in the rotational direction of arrow B, e.g., using the driving mechanism 814, the hinge 816 and locking mechanism, and/or the inflatable bladder 818 associated with the third sub-array 42c. The solar array 40 is then deployed and ready to produce power.

FIG. 28 shows a roller deployment system 820 configured to unfold one or more one sub-arrays 42. The roller deployment system 820 may be positioned on a lower portion of the trailer 800. Alternatively, the roller deployment system 820 may be positioned on an upper or middle portion of the trailer 800. A door 821 of the roller deployment system 820 may open in the rear (or alternatively, on a top or side) of the trailer 800 and the sub-array 42 which is stored on a roller 822 is unwound and drops to the ground as the trailer 800 is moving. The speed of deployment is approximately the same as the forward speed of the trailer 800. Once the trailer 800 stops, the solar array 42 is ready to produce power. To return the sub-array 42 to the trailer 800, a driving mechanism 824 (e.g., a motor) connected to the roller 822 may retract and wind the sub-array 42 back up. The sub-array 42 may enter and exit through a narrow opening 826 provided by opening the door 821. The narrow opening 826 or a protective screening system 828 (e.g., a screen or a row of bristles may be lowered into the opening provided by the opened door 821) provided in the narrow opening 826 may prevent debris, such as sticks, from being rolled into the roller deployment system 820 with the sub-array 42.

Figure 29:
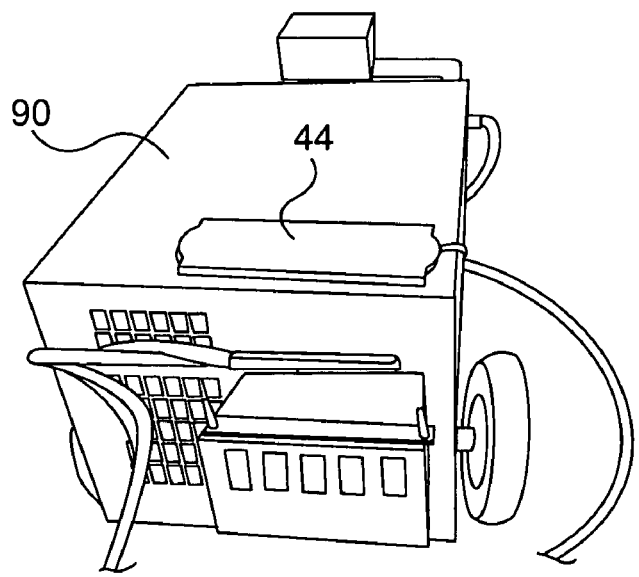
FIG. 29 is a perspective view of a trailer with a power system including an exemplary disclosed generator with a solar panel.

In an alternate embodiment, as shown in FIG. 29, the fuel power generating device 90 or other generator may be connected to at least one solar panel 44 in a trailer. For example, the solar panel 44 may be adhered to a surface (e.g., a top surface) of the fuel power generating device 90 and may maintain a charge (e.g., a 12-volt charge) in a starting battery of the fuel power generating device 90, for example, during extended periods of non-use, e.g., while the fuel power generating device 90 and the solar panel 44 are stored in the trailer.

As a result, the trailer 10, 10a, 200, 300, 400, 500, 600, 700, 800 and the pick-up truck 900 may provide hybrid renewable energy with advanced technology wind, solar, and/or other power generating systems, and may serve as a practical, renewable energy solution. The trailer 10, 10a, 200, 300, 400, 500, 600, 700, 800 and the pick-up truck 900 may be used in various applications, such as international relief efforts and disaster recovery, homeland security, communications, military, intelligence, energy and healthcare.

The power system 30 provided in the trailer 10, 10a, 200, 300, 400, 500, 600, 700, 800 and the pick-up truck 900 may be set up in minutes, expandable, and easily maintainable. The power system 30 may produce a large amount of power while its size and weight may be minimized.

In view of the foregoing disclosure, one skilled in the art may readily conceive or identify additional configurations of the trailer 10, 10a, 200, 300, 400, 500, 600, 700, 800, the skid 100, and the pick-up truck 900 depending, e.g., on the operator's requirements and intended locations. The foregoing description of possible implementations of the trailers 10, 10a, 200, 300, 400, 500, 600, 700, 800, the skid 100 and/or the pick-up truck 900 does not represent a comprehensive list of all such implementations or all variations of the implementations described. The description of only some implementations should not be construed as an intent to exclude other implementations. For example, any of the trailers 10, 10a, 200, 300, 400, 500, 600, 700, 800, the skid 100 and/or the pick-up truck 900 described above may include one or more of any of the components of the power system 30 described above. One or more of the components of any of the trailers 10, 10a, 200, 300, 400, 500, 600, 700, 800, the skid 100, and/or the pick-up truck 900 described above may be incorporated into any other one of the trailers 10, 10a, 200, 300, 400, 500, 600, 700, 800, the skid 100, and/or the pick-up truck 900 described above.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A trailer comprising:
   a frame defining a body of the trailer; and
   a power system stored in the body of the trailer, at least a portion of the power system being integral to the body of the trailer, the power system including at least one power generating device stored in the body, the at least one power generating device including a wind power generating device; and
   an auto-deploy mast system configured to automatically deploy the wind power generating device.

2. The trailer of claim 1, wherein the at least one power generating device includes a solar array.

3. The trailer of claim 2, wherein the solar array is stored in the housing in a folded configuration.

4. The trailer of claim 2, wherein the solar array includes a female connector for connecting the solar array to a male connector in the power system.

5. The trailer of claim 1, wherein the wind power generating device includes a wind turbine.

6. The trailer of claim 1, wherein the trailer includes wheels and is configured to be towed by a vehicle.

7. The trailer of claim 1, wherein the power system further includes:
   a battery system including at least one battery; and
   a master switch capable of disconnecting the battery system during transport.

8. The trailer of claim 1, wherein the power system further includes at least one emergency cut-off switch.

9. The trailer of claim 1, wherein the power system includes a plurality of input and output connectors for connecting at least one of an additional power generating device, a power supply, and a load to the power system.

10. The trailer of claim 1, wherein the power system includes a control panel configured to allow an operator to control the power system.

11. The trailer of claim 1, wherein the power system further includes a battery system including at least one battery stored within a battery housing.

12. The trailer of claim 11, further including a roof on top of the battery housing that is raised above the battery housing to allow air to flow between the housing and the at least one battery.

13. The trailer of claim 11, wherein the at least one battery is coated with low emissivity paint.

14. The trailer of claim 11, further including a cooling system for cooling the battery system.

15. The trailer of claim 14 wherein the cooling system includes a fan.

16. The trailer of claim 1, wherein the at least one power generating device includes a solar array, the solar array including at least two solar panels connected by a Velcro connection.

17. The trailer of claim 1, wherein the at least one power generating device includes a solar blanket including at least one solar panel.

18. The trailer of claim 17, wherein the at least one solar panel of the solar blanket is attached to a flexible material.

19. The trailer of claim 17, wherein the at least one solar panel is replaceable.

20. The trailer of claim 1, wherein the at least one wind power generating device is integrated into the body of the trailer.

21. The trailer of claim 1, wherein the auto-deploy mast system is configured to automatically control movement of the at least one wind power generating device between a retracted configuration and a deployed configuration.

22. The trailer of claim 21, wherein a pole of the at least one wind power generating device is approximately horizontal when the at least one wind power generating device is in the retracted configuration and vertical when the at least one wind power generating device is in the deployed configuration.

23. The trailer of claim 1, wherein the at least one wind power generating device includes a telescoping pole, and the auto-deploy mast system is configured to control an amount of extension or retraction of a length of the telescoping pole.

24. A trailer comprising:
a frame defining a body of the trailer; and
a power system stored in the body of the trailer and configured to provide power to a first load and a second load, at least a portion of the power system being integral to the body of the trailer, the power system including:
at least one power generating device stored in the body and removable from the body, and
at least one automatic load shedding device configured to determine that the first load is more critical than the second load and automatically shed the second load while maintaining the first load based on the determination.

25. The trailer of claim 24, wherein:
the power system further includes at least one wind power generating device stored in the body.

26. The trailer of claim 25, wherein the at least one wind power generating device is integrated into the body of the trailer and the trailer further includes:
an auto-deploy mast system configured to automatically deploy the at least one wind power generating device.

27. The trailer of claim 26, wherein the auto-deploy mast system is configured to move the at least one wind power generating device between a retracted configuration and a deployed configuration.

28. The trailer of claim 27, wherein a pole of the at least one wind power generating device is approximately horizontal when the at least one wind power generating device is in the retracted configuration and vertical when the at least one wind power generating device is in the deployed configuration.

29. The trailer of claim 26, wherein the at least one wind power generating device includes a telescoping pole, and the auto-deploy mast system is configured to extend a length of the telescoping pole.

30. The trailer of claim 25, wherein the at least one wind power generating device includes a wind turbine stored in the body and removable from the body.

31. The trailer of claim 25, wherein:
the at least one power generating device includes at least one solar power generating device stored in the body and removable from the body, and
the at least one solar power generating device includes at least one solar array that is capable of being spread out on a surface near the trailer.

32. The trailer of claim 31, wherein the at least one solar array is capable of being folded and stored in the body of the trailer.

33. The trailer of claim 25, wherein:
the at least one power generating device includes at least one solar power generating device stored in the body and removable from the body, and
the at least one solar power generating device includes at least one solar array that is capable of being spread out on a surface near the trailer.

34. The trailer of claim 25, wherein:
the at least one power generating device includes at least one solar power generating device stored in the body and removable from the body, and
the at least one solar power generating device includes at least one solar array having at least two solar panels connected by a Velcro connection.

35. The trailer of claim 25, further including at least one fuel power generating device.

36. The trailer of claim 25, further including at least one battery.

37. The trailer of claim 25, wherein:
the trailer is configured to be towed by a vehicle; and
the frame includes a front panel, side panels, and a rear panel, and the trailer further includes a hitch configured to connect the trailer to the vehicle.

38. The trailer of claim 24, wherein the power system is configured to provide power to additional loads, and the at least one automatic shedding device is further configured to determine whether each of the additional loads is critical for maintaining or non-critical for shedding.

39. A trailer comprising:
a frame defining a body of the trailer:
a power system stored in the body of the trailer, at least a portion of the power system being integral to the body of the trailer, the power system including at least one power generating device stored in the body and removable from the body; and
a temperature control system configured to control a temperature within the trailer.

40. The trailer of claim 39, wherein the temperature control system is thermostatically controlled.

41. The trailer of claim 39, wherein the at least one power generating device includes a solar array.

42. The trailer of claim 41, further including a system configured to automatically deploy the solar array.

43. The trailer of claim 1, wherein the at least one power generating device includes a fuel power generating device configured to receive power from a solar array.

44. The trailer of claim 43, wherein the fuel power generating device is configured to receive power from the solar array while the fuel power generating device and the solar array are in a stored configuration on the trailer.

45. The trailer of claim 39, wherein the power system further includes at least one wind power generating device stored in the body.

46. The trailer of claim 45, wherein the at least one wind power generating device is integrated into the body of the trailer and the trailer further includes:

an auto-deploy mast system configured to automatically deploy the at least one wind power generating device.

47. The trailer of claim 46, wherein the auto-deploy mast system is configured to automatically control movement of the at least one wind power generating device between a retracted configuration and a deployed configuration.

48. The trailer of claim 47, wherein a pole of the at least one wind power generating device is approximately horizontal when the at least one wind power generating device is in the retracted configuration and vertical when the at least one wind power generating device is in the deployed configuration.

49. The trailer of claim 46, wherein the at least one wind power generating device includes a telescoping pole, and the auto-deploy mast system is configured to extend a length of the telescoping pole.

50. A method of providing power using a trailer, the trailer including a frame defining a body of the trailer and a power system stored in the body of the trailer, at least a portion of the power system being integral to the body of the trailer, the power system including at least one power generating device stored in the body and a battery system, the method including:
 positioning the trailer at a first location;
 receiving power from the at least one power generating device at the first location;
 storing the power received from the at least one power generating device in the battery system;
 operating a master switch to electrically disconnect the battery system from the at least one power generating device; and
 transporting the trailer to a second location while the master switch electrically disconnects the battery system from the at least one power generating device.

51. The method of claim 50, further including operating the master switch at the second location to allow the battery system to electrically connect to the at least one power generating device.

\* \* \* \* \*